(12) United States Patent
Sarnikowski et al.

(10) Patent No.: US 6,453,406 B1
(45) Date of Patent: Sep. 17, 2002

(54) MULTIPROCESSOR SYSTEM WITH FIBER OPTIC BUS INTERCONNECT FOR INTERPROCESSOR COMMUNICATIONS

(75) Inventors: Scott Sarnikowski, Santa Clara; Unmesh Agarwala, San Jose; Stanley S. Quan, San Jose; Charles E. Comstock, San Jose; Frank G. Moore, Oakhurst, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/166,279

(22) Filed: Dec. 13, 1993

Related U.S. Application Data

(63) Continuation of application No. 07/599,325, filed on Oct. 17, 1990, now abandoned.

(51) Int. Cl.⁷ .............................................. G06F 15/00
(52) U.S. Cl. ........................................................ 712/11
(58) Field of Search ................................. 395/800, 200, 395/325; 370/85.5, 85.13, 85.14, 94.1; 364/562; 712/11

(56) References Cited

U.S. PATENT DOCUMENTS

| | | | |
|---|---|---|---|
| 4,228,496 A | | 10/1980 | Katzman et al. ............ 395/200 |
| 4,287,592 A | * | 9/1981 | Paulish et al. ............ 370/85.14 |
| 4,363,093 A | * | 12/1982 | Davis et al. ................. 395/200 |
| 4,396,983 A | * | 8/1983 | Segarra et al. .............. 395/200 |
| 4,646,232 A | * | 2/1987 | Chang et al. ................ 395/325 |
| 4,663,706 A | | 5/1987 | Allen et al. .................. 395/200 |
| 4,667,287 A | | 5/1987 | Allen et al. .................. 395/800 |
| 4,672,607 A | * | 6/1987 | Nakayashiki et al. ..... 370/85.14 |
| 4,707,827 A | * | 11/1987 | Bione et al. ............. 370/85.13 |
| 4,747,100 A | * | 5/1988 | Roach et al. ............... 370/85.5 |
| 4,751,727 A | * | 6/1988 | Brahm et al. ................. 379/94 |
| 4,768,145 A | * | 8/1988 | Wheelwright et al. ....... 395/325 |
| 4,836,317 A | | 6/1989 | Straussmann ................ 178/2 R |
| 4,872,125 A | * | 10/1989 | Catlin ......................... 364/578 |
| 4,878,218 A | * | 10/1989 | Takada ....................... 370/94.1 |
| 4,888,684 A | | 12/1989 | Lilja et al. ................... 395/325 |
| 4,987,536 A | * | 1/1991 | Humblet ...................... 395/325 |
| 5,086,426 A | * | 2/1992 | Tsukakoshi et al. ...... 370/85.13 |
| 5,088,032 A | * | 2/1992 | Bosack ........................ 395/200 |
| 5,095,480 A | * | 3/1992 | Fenner ....................... 370/94.1 |
| 5,115,495 A | * | 5/1992 | Tsuchiya et al. ............. 395/200 |
| 5,119,481 A | * | 6/1992 | Frank et al. ................. 395/325 |
| 5,247,464 A | * | 9/1993 | Curtis ......................... 364/562 |
| 5,253,248 A | * | 10/1993 | Dravida et al. ............... 370/16 |
| 5,341,504 A | * | 8/1994 | Mori et al. .................. 395/800 |

\* cited by examiner

*Primary Examiner*—John A. Follansbee
(74) *Attorney, Agent, or Firm*—Leah Sherry; Oppenheimer, Wolff & Donnelly, LLP

(57) ABSTRACT

In a data processing system of the type having multiple processor units coupled to one another by a bus means for interprocessor communications there is provided a fiber optic interconnection system to interconnect the bus means of multiple processor sections to one another, thereby allowing groups of the processor units to be physically spaced from one another. The fiber optic interconnect system includes, for each multiprocessor unit section functions to receive messages communicated on the interprocessor bus of that section for receipt by a destination processor of the other section, format the message for fiber optic transmission, and transmit the message; and circuitry for receiving messages on the fiber optic link, scheduling the message for transmission to the destination processor, and maintaining that scheduling in the face of receipt of another message for the same processor unit. The fiber optic interconnect system includes means for configuring the system to identify which processor units are in which section and, when more than two sections are interconnected by the fiber optic link, provide information as to the shortest route to the destination processor from a section.

20 Claims, 12 Drawing Sheets

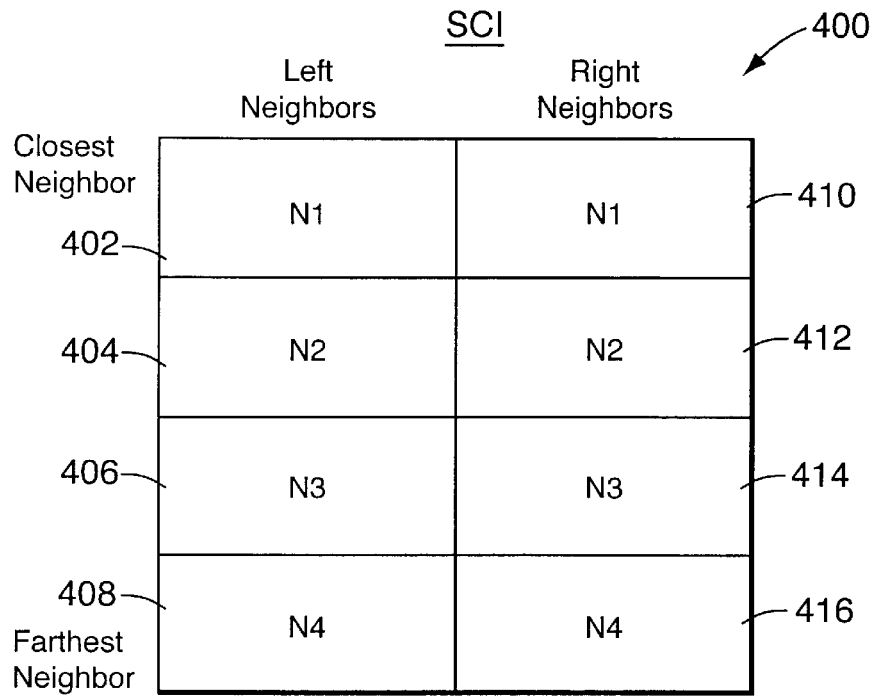
FIG. 12
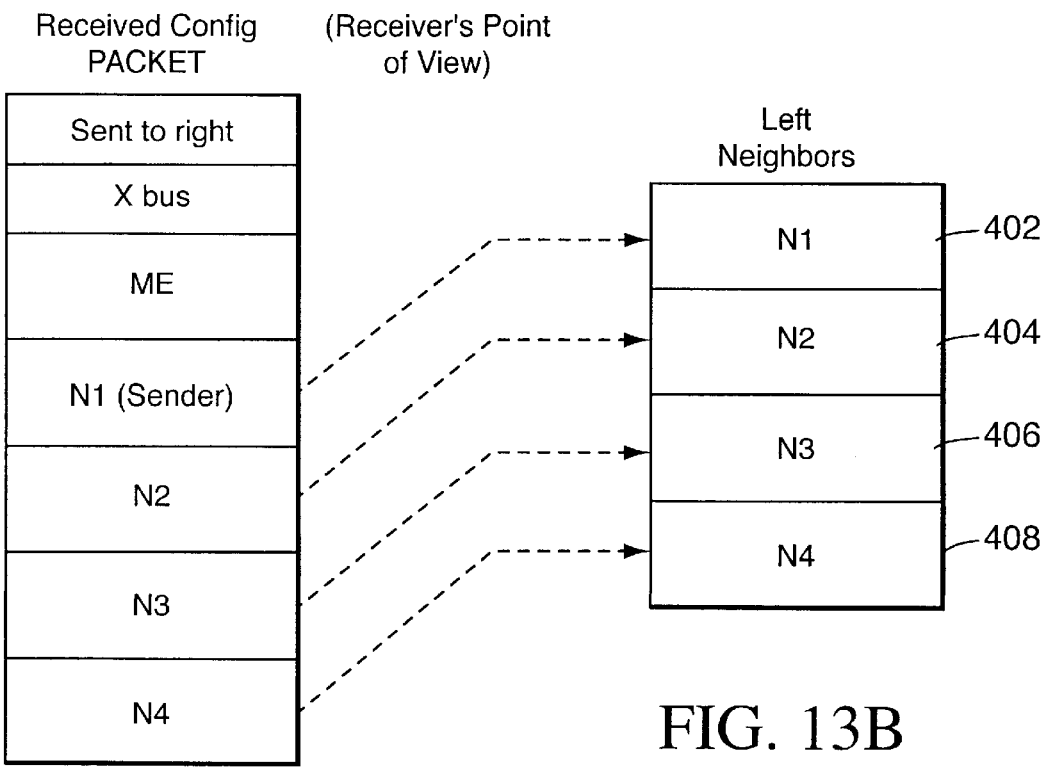
FIG. 13A
FIG. 13B

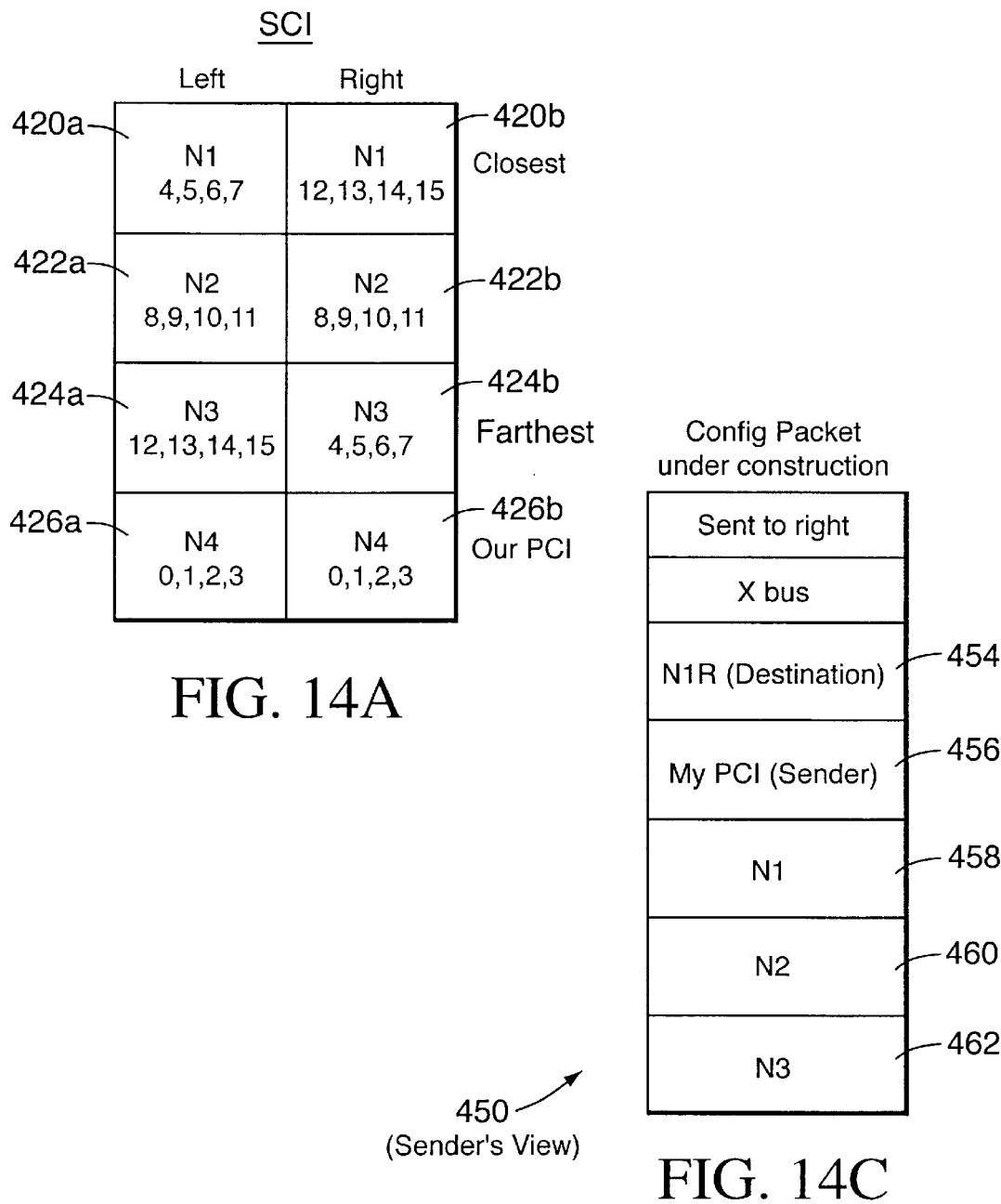
FIG. 14A
FIG. 14C
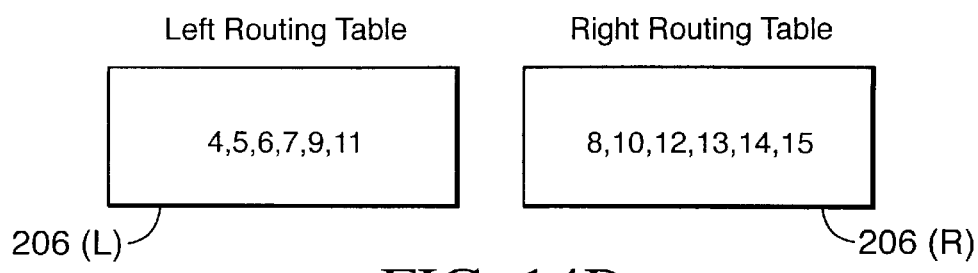
FIG. 14B

MULTIPROCESSOR SYSTEM WITH FIBER OPTIC BUS INTERCONNECT FOR INTERPROCESSOR COMMUNICATIONS

This is a Continuation of application Ser. No. 07/599,325, filed Oct. 17, 1990, now abandoned.

BACKGROUND OF THE INVENTION

The present invention is directed generally to data processing, and more particularly to data processing systems in the form of multiple processor units interconnected to one another by an bus means for interprocessor communication therebetween. More particularly, the invention is directed to a data processing system in which groups or sections of processors are coupled to one another by a communications link that routes messages from one processor in one section to another processor in another section.

An increasingly popular type of data processing system is one implemented with a number of individual processor units capable of operating either individually or in parallel to perform data processing tasks. This type of processing system differentiates from a network of interconnected processing systems by the fact that the individual processor units are interconnected by a bus dedicated to interprocessor communication. Examples of this form of processing system may be found in U.S. Pat. Nos. 4,228,496 and 4,888,684.

As the design of such multiprocessor data processing systems evolves, and as the technology available for that design becomes more complex, limits on the construction of such systems are encountered. One such limit involves the interprocessor bus itself. Larger multiprocessor systems are often housed in multiple cabinets of relatively large size. Since the processor units housed in each of the cabinets must be connected by the interprocessor bus, the spacing between the processor units becomes critical as a result of the electrical characteristics of the bus. Thus, for example, if the spacing between processors becomes too great, the electrical characteristics of the interprocessor bus can place severe limitation on bus speed, the number of processor units that may be connected, and the like.

Also, there are constraints upon the placement of the individual cabinets themselves.

Further, it is often true that subsequent generations of multiprocessor systems having an interprocessor bus for processor to processor communications are designed and built as technology advances. It may be desirable to intermix processor units from earlier designs with those of later designs. However, the electrical characteristics of the interprocessor bus and connection of that bus to the processor unit itself often differ from that of earlier designs, partly from use of newer technology. Thus, mixing earlier processor units with later processor units in multiprocessor system design can be prohibitive.

Thus, it is evident that some resolution to the limitations imposed upon extensions of interprocessor buses used to interconnect multiple processor units is needed.

SUMMARY OF THE INVENTION

The present invention provides a communications link, here in the form of a fiber optic interconnect system, that permits smaller groups or sections of processor units to be interconnected by an interprocessor bus (IPB) for processor to processor communication, permitting also communication with other like configured multiprocessor systems by the fiber optic interconnection system. The invention permits interprocessor communication between processors positioned at greater distances from one another than heretofore, and allows processors having different electrical and other characteristics for connection to an interprocessor bus to communicate with one another.

Broadly, the invention is directed to allocating the processor units of a multiprocessor system to sections of processor units. The processor units of each section are intercoupled by an interprocessor bus for processor-to-processor communication. Each section, in turn, is connected by a communications link so that processor units of one section can communicate with those of any other section. In the preferred embodiment of the invention, the interprocessor bus of a section is coupled to the interprocessor bus of "neighbor" sections by data transfer sections that provide the interface between the interprocessor bus of a section and the communications links. Further, the preferred implementation of the communication link between section is in the form of a bi-directional fiberoptic data path between each neighbor section.

Each bi-directional fiber optic data path is formed using a pair of optical fibers. Each data transfer section includes a pair of "channels," one for each optical fiber. One optical fiber, and its associated channel of the data transfer section, is dedicated to communicating information packets, containing a processor message, from the fiber link to the IPB of that section; the other optical fiber, and its associated channel, is dedicated to communicating processor unit generated messages from the interprocessor bus to the fiber optic link where they are transmitted as information packets to a receiving data transfer section of a neighbor section.

Communications over the IPB between the processor units of a particular section is in the form of messages. A message, in turn, is contained in one or more multi-word data "packets" (a "word," as used herein, is 16 bits of data). To differentiate between what is communicated on the IPB from that on the communications link, "IPB packet" will refer to what is generated by a processor unit and communicated on the IPB for receipt by a destination processor unit; "information packet" will refer to what is communicated on the communications link. An information packet will include an IPB packet.

Each data transfer section includes buffer memory for storing IPB packets (removed from the information packets that contained them when communicated on the communications link) en route to the IPB or IPB packets from the IPB to be transmitted on the outgoing fiberoptic link. The buffer memory is managed in a way that operates to ensure the sequentiality of packets. For example, since messages may comprise multiple packets, the transfer of a multi-(IPB) packet message from one (the "source") processor unit in one section to another (the "destination") processor unit in another section will involve multiple information packets (one for each IPB packet). When transferred from a section by a data transfer section, these information packets are stored in, and retrieved from, the buffer memory in a manner that maintains the sequence of the IPB packets as generated by the source processor unit. In a similar fashion, the sequence of received information packets is also maintained in their transfer to the interprocessor bus.

Packets received by each channel, whether from the communications link for transfer to the IPB, or from the IPB for transfer to the communications link, are each identified while resident in the data transfer section by a destination address. When received by a channel, each packet is stored in the buffer memory, at a location determined in part by the destination address, until it can be forwarded to its ultimate destination (i.e., The communications link or the IPB). The destination address is developed by the channel and temporally stored in a manner that "schedules" the corresponding packet for transmission. Subsequently, when the channel prepares to transmit the packet (onto the optical fiber or the IPB), the destination address is retrieved and used to retrieve the packet from the buffer memory. In the event that transmission is prematurely terminated, the channel will return the destination address to the temporary storage, where it resides until the packet is again to be sent.

When a packet is successfully sent onto its ultimate destination by the channel, the location it occupied in buffer memory is released; until then the location is flagged as being occupied.

Preferably, the processor units are interconnected in a ring topology so that there are two paths from a processor unit in any section to a processor unit in any other section. Each data transfer section includes a routing table that provides information as to the shortest available route to processor units of other sections.

Finally, there is included an autoconfiguration routine, and means for implementing that routine, for writing the respective routing tables to provide them with the proper view of system configuration.

A number of advantages are achieved by the present invention. First, using the communications link interconnect system of the present invention provides more flexibility as to the physical distance that may be allowed between processor units of a multiprocessing system. When processor units are contained in multiple cabinets, the present invention also provides more flexibility as to arrangement of those cabinets.

Further, the present invention permits mixing of different styles of processor units using interprocessor bus communications without concern for the electrical connections; that is, one style of processor unit can be coupled to another style of processor unit, for interprocessor communications, using the present invention without modifying both to achieve electrical compatibility on the intercommunication bus.

These and other inventions will become apparent to those skilled in the art upon a reading of the following description of the invention, which should be taken in conjunction with the drawings.

BRIEF DESCRIPTION OF THE DRAWINGS

FIG. 12 is a pictorial illustration of the secondary conformation information (SCI) maintained by the invention;

FIGS. 13A and 13B diagrammatically illustrate construction of an SCI from data contained in a received configuration status packet;

FIGS. 14A and 14B illustrate loading the routing table registers from data contained in the SCI; and FIG. 14C illustrations construction of a configuration status packet.

DESCRIPTION OF THE INVENTION

Figure 1:
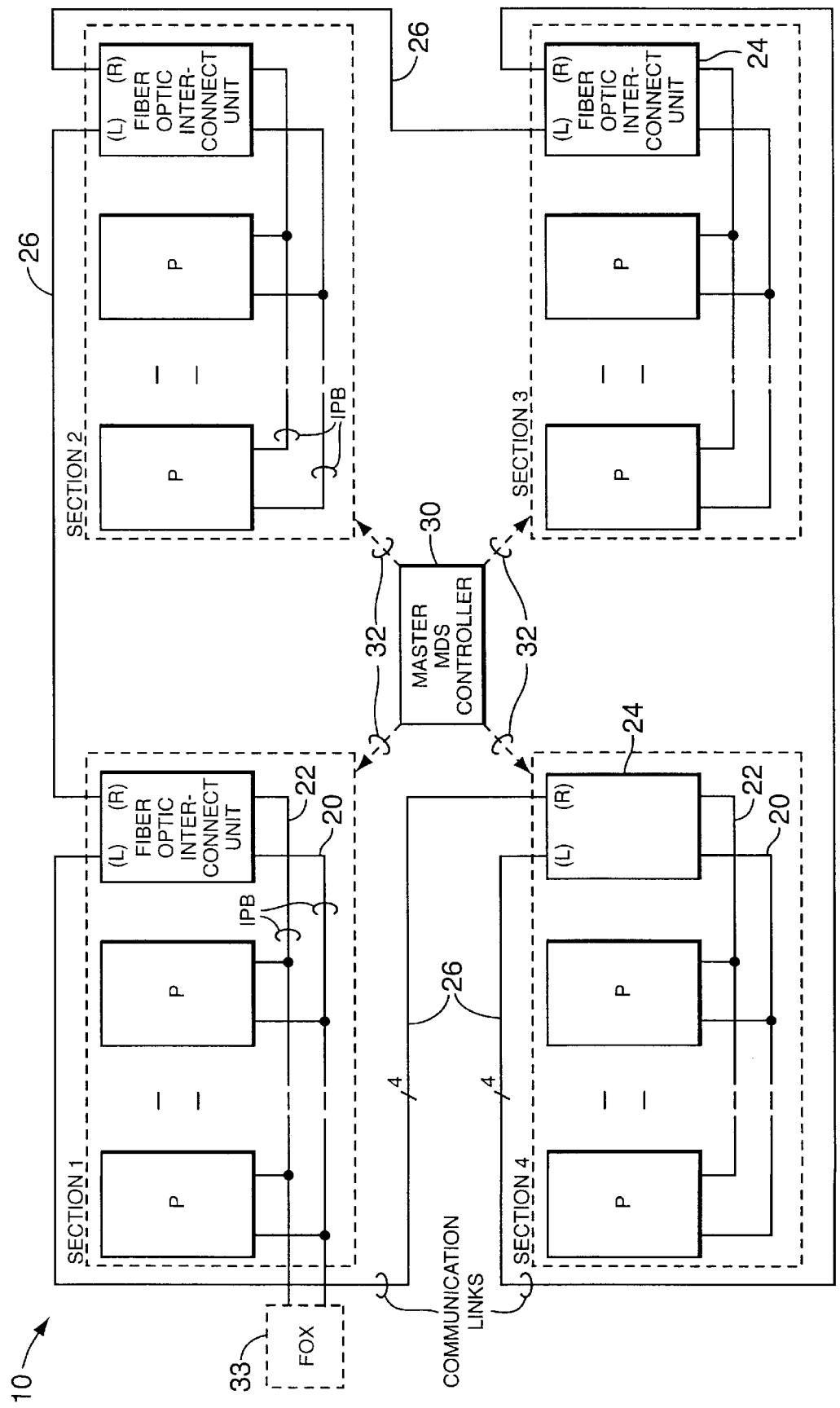
FIG. 1 illustrates a multiprocessing system in which sections containing multiple processors are coupled together in a ring configuration by a communications link interconnection according to the present invention.

Overview:

Referring first to FIG. 1, a multiprocessor system comprising a number of individual processor units (P) are shown as being arranged in four "sections," 1, . . . ,4. Within each of those sections 1, . . . ,4, are preferably at least two processor units (P) coupled to one another by preferably a pair of interprocessor buses (IPB) 20, 22 for processor to processor communication. Processor unit and bus pairs are preferred for implementing a fault tolerant philosophy, but that philosophy is not necessary to the present invention.

The IPBs 20, 22 are generally constructed and operated as taught by U.S. Pat. Nos. 4,224,496 and 4,888,684, whose teachings are incorporated herein by reference to the extent necessary. Each IPB 20, 22 is composed of multiple signal lines for carrying parallel bits of data, control signals, and the like.

Also within each of the sections 1, . . . ,4 is a fiber optic interface unit 24 that connects the IPBs 20, 22 to a communications link 26.

Preferably, the processor system 10 is configured by the communications link 26 in a ring. When so configured, each of the sections 1, . . . ,4 will have a left (L) and right (R) neighbor. Each fiber optic interconnect unit 24 includes two separate data transfer sections, one for each IPB 20, 22. Each data transfer section, in turn, communicates its associated IPB to that of the two neighbors of that section.

Figure 3:
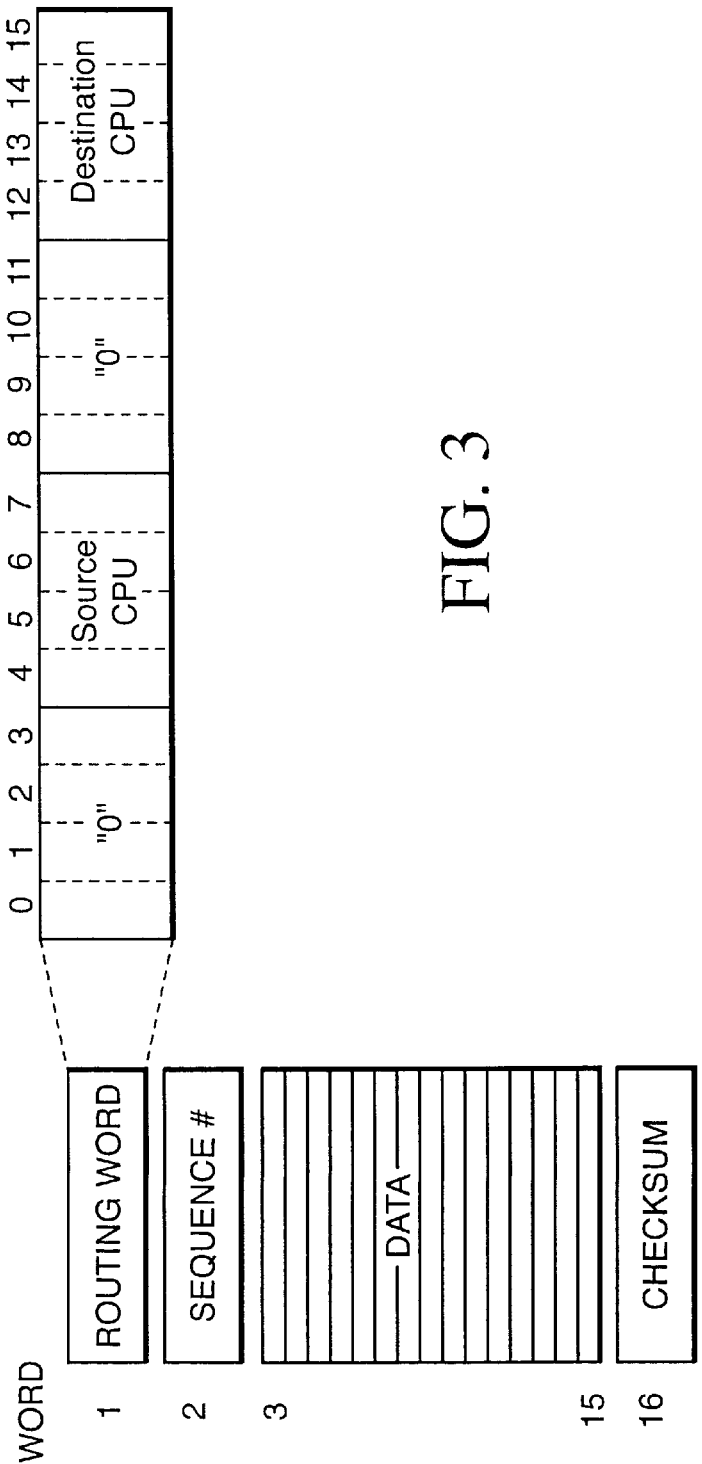
FIG. 3 is an illustration of the packet format used for interprocessor communication on the interprocessor bus of each section.

As hereinbefore indicated, processor to processor communication on one or the other of the IPB 20, 22 from a source processor to a destination processor is in the form of messages comprising one or more 16-word IPB packets. IPB packets are 16-bit parallel, word serial, and begin with a routing word (FIG. 3) that contains, with other information described below, the identity of the destination processor (bits 12–15). A bus controller (not shown) is provided for each of the IPBs 20, 22 to grant access to each processor P to the IPB. When access is granted, a 16-word IPB packet is communicated, and received by that processor P identified as the destination processor in the routing word of the packet.

This protocol is maintained by the present invention. Packets sent by a processor P of one section (e.g., section 4) to a processor P located in another section (e.g., section 2) are communicated via the fiber optic interconnect units and communication links 26 in a manner transparent to the source and destination processors P.

Further, the present invention provides means for configuring each fiber optic interconnect unit 24 in a manner that allows the determination of the shortest available distance from it to the destination processor. For example, if a processor P of section 4 generates a packet bound for a destination processor P in section 3, the fiber optic interconnect unit 24 will first determine that the packet, initially conducted on the IPB 20 or 22, is to be transferred outside section 4 and, therefore, will pick up the packet, determine that the packet is bound for section 3, and transmit it via the appropriate link 26 from its left portion L for receipt by the fiber optic interconnect unit 24 of section 3 via its right portion R of fiber optic interconnect unit 24.

Each fiber optic interconnect unit 24 maintains a picture of the configuration of the processor system 10 from which it can determine what processor units P are located in its own section, and what processor units P are located in the other sections. This picture also provides it with sufficient information to allow the fiber optic interface unit 24 to determine the shortest available route to the destination processor. The configuration picture is established and maintained by a process termed "autoconfiguration" described further below. Autoconfiguration, in turn, relies in part on a maintenance diagnostic system (MDS) which includes a master MDS controller 30 coupled to each section 1, . . . ,4 by a diagnostic maintenance bus (DMB) 32 in a star configuration. The master MDS controller 30 is capable of interrogating the processor units P to determine which (by their identification number, a number 0 through 15 for a 16 processor system) are located in which sections. This information is communicated, again in packet form, to each fiber optic interconnect unit 24 via DMB system 32. In turn, each fiber optic interconnect unit 24 uses the communication links 26 to communicate packets to the fiber optic units 24 of its neighbors, providing them with its own picture of the system while, at the same time, they are providing it with their configuration pictures. This autoconfiguration packet transmission activity occurs approximately every N (e.g., 300) milliseconds, ensuring that the fiber optic interconnect units 24 always have up-to-date information as to the configuration of the processor system 10. This information will also indicate whether one of the fiber optic links 26 has been broken so that the ring configuration illustrated in FIG. 1 is not fully complete for that particular IPB.

Each of the processor unit-containing sections 1, . . . 4, are substantially identical in structure and configuration, except that some may have more processors than others. The fiber optic interconnect units 24, however, contained in each of the sections 1 . . . 4, are in essence identical. Thus, only one section, section 2, will be described in some detail.

Referring now to FIG. 2, section 2 is illustrated, comprising four processor units P and a fiber optic interconnect unit 24, intercoupled by an X and Y IPB 20, 22. As FIG. 2 illustrates, the fiber optic interconnect unit 24 is formed from a pair of data transfer sections (DTS) 34, 36 respectively coupled to the X and Y IPBs 20, 22.

As FIG. 2 further illustrates, the communication links 26 are formed from two pairs of optical fibers, each optical fiber forming a uni-directional path between two sections; each pair of optical fibers, therefore, form a bi-directional communications path. Thus, as FIG. 2 shows, the communications link 26 between section 2 to section 1 comprises the fiber optic link pair 40, 42, while the communications link between section 2 and section 3 is formed by the two fiber links 44, 46. Note also that the DTSs 34 (i.e., LEFT and RIGHT DTSs 34a, 34b) will couple the X-IPB 20 to the left and right neighbors (sections 1 and 3) of section 2 via the fiber optic links 40 and 44, respectively. Similarly, the DTSs 36 (LEFT and RIGHT DTSs 34a, 34b) communicate the Y-IPB 22 to its left (section 1) and right (section 3) neighbors by the bi-directional paths formed by the fiber optic links 42 and 46.

Associated with each of the processors P, as well with each DTS 34, 36, is a diagnostic data transceiver (DDT) 50. Each of the DDTs 50 are intercoupled to one another, and to the master MDS controller 30 by the diagnostic maintenance bus (DMB) 32. In prior multiprocessor systems of the type to which the present invention is directed, the individual DDTs 50 associated with each processor P operate to perform various monitoring and testing operations, informing the master MDS controller 30 via the DMB 32 of the results of that activity. Here, the DDTs are used, as will be seen, to provide each DTS 34, 36 with a picture of the configuration and make-up of the processor 10.

As has been seen, particularly with respect to FIG. 1, utilization of the fiber optic interconnect units 24, in effect, causes the IPB 20, 22 to be broken into a number of smaller IPB sections, sections 1, . . . ,4. Without the fiber optic interconnect system of the present invention, the processing system 10 of FIG. 1 would be formed as it has been in the past, from a unitary IPB structure. The fiber optic interconnect units 24 connect the separate sections to one another with optic fibers forming a unitary system.

There have been entities on the IPBs 20, 22 other than a processor P in prior configurations of the processor system utilized by the assignee of the present invention. For example, there heretofore exists a fiber optic exchange system (FOX) used to connect, in network configuration, a number of individual processor systems 10. An example of such a network can be found in U.S. Pat. No. 4,667,287. Such a connection is illustrated generally in FIG. 1 , showing a FOX interface 33 connected to the X and Y IPBs 20, 22 of the processor section 1.

Each entity on an IPB section (i.e., a processor P or a FOX connection 33) converses over the IPB 20 or 22 as if all other such entities of the processor system 10 were physically present on a single monolithic IPB. Each fiber optic interconnect unit 24 is cognizant (as a result of a autoconfiguration process) of the processor units P in its own section, other sections in the processor system 10, as well as the presence and location of any FOX connection. The fiber optic interconnect unit 24 accepts only those IPB packets communicated on the associated IPB 20, 22, in the form shown in FIG. 3 that are destined for entities on other IPB sections. It places those IPB packets in information packets, and sends them out on one of the optic fibers forming the communications link 26 in the direction of the shortest available path measured in "fiber hops." The transmitted information packet travels through the fiber optic cable to another section where it is received by the associated fiber optic interconnect unit 24 and reproduced on the corresponding IPB 20, 22 according to standard IPB protocol. If the reproduced IPB packet is destined for a processor P on that particular IPB, it is accepted by that processor unit; if not, the fiber optic interconnect unit 24 will pick it off the IPB and forward it, in another information packet, to the next IPB section. This goes on until the IPB packet is eventually received by the destination processor unit.

As illustrated in FIG. 2, the X-IPB 20 communicates to neighboring sections 1 and 3 by the pair of LEFT and RIGHT DTSs 34a, 34b and the respective bi-directional fiber optic links 40 and 44. In similar fashion, the Y-IPB 22 communicates to (its sibling IPB) in section 1 by the LEFT DTS 36a, and to its sibling IPB of section 3 by the RIGHT DTS 36b.

Data Transfer Sections:

As preferably constructed, a fiber optic interconnect unit 24 cannot transfer an information packet directly from one communication link (e.g., fiber optic link 40) 26 to another (e.g., fiber optic link 44). The fiber optic interconnect unit 24 is, as FIG. 2 illustrates, divided into two pairs of data transfer sections (DTS) 34, 36, each of which operates independently and provides a bi-directional interface between a fiber optic link and the associated IPB. Each DTS 34a, 34b or 36a, 36b can send information packets to one another only across an IPB; that is, for example, a data packet received from section 1 by the LEFT DTS 34a (i.e., via an incoming optical fiber of the fiberoptic link 40) bound for a processor unit P located in section 3, to the right of section 2, must first be applied to the IPB 20 where it is again picked up by the RIGHT DTS 34b (and transmitted, via an outgoing optical fiber of the fiberoptic link 44, to section 3).

In order to gain access to the packet transmission cycles of the IPB section, each DTS pair 34, 36 borrows one or more processor unit identification codes (I.D.'s) from those not present in that section. These I.D.'s have no correlation with the IPB packet that is transferred once the bus cycle is granted, and merely serve as a convenient mechanism to convey a request to transfer to the bus controller (not shown) on the IPB 20, 22. In fact, the fiber optic interconnect unit 24 re-creates IPB packets on the IPBs of the destination and intervening sections in exactly the same way as they appeared on the IPB of the originating section. This includes asserting a control signal on the IPB for those packets received from the FOX interface 33 (FIG. 1).

As may be seen from U.S. Pat. No. 4,888,684, the IPB protocol is negative acknowledgment (NAK) based, in which a sender is NAKed only if the receiver is unable to receive the packet. There is no acknowledgement of a successful transfer. To the sender, therefore, there was no difference between a successful send of a packet and no receiver on the bus.

Each of the DTSs 34, 36 utilizes a Transparent Asynchronous Xmitter-Receiver Interface chip set, having Part Nos. AM7968/AM7969, sold by Advanced Micro Devices ("AMD"), located at 90 Thompson Place, Sunnyvale, Calif. 94998. A description of the chip set (sold under the AMD trademark, "TAXIchip") can be found in the publication entitled AMD Product Information, the specific product being described in a publication entitled "AM7968/M7969 TAXIchip™ Integrated circuits" Publication No. 07370, Rev. C, Amendment/O, Issue Date May 1989. The AMD chip set, as it shall hereinafter referenced, is a receiver/transmitter pair that implements standard FDDI 4B/5B encoding to transmit data at, for example, approximately 10 MBytes/seconds. The information packet format is illustrated in FIG. 2B. The total number of bytes within any one information packet, including special characters, is 36. The packet is preceded by a start of transmission (SOT) character, and concludes with an end of transmission (EOT) character, both of which are specially encoded command characters supported by the AMD chip set. The packet includes an error detecting code (EDC), which is a two-byte field and provides an error detecting mechanism using conventional cyclic redundancy code.

Although there is only one EOT character, there can be different SOT characters to identify several different types of packets: First, there is an SOT character to identify regular IPB information packets, identifying the fact that the information of the packet originated in one of the processor units P of the processor system 10; second, there is an SOT character (KSOT) to identify information that originated outside the processor system 10, but communicated thereto by the FOX connection 33; and, third, there is a character (DSOT) to identify DDT packets used to communicate diagnostic and configuration information between the DDTs 50 of the different fiber optic interconnect units 24 within the processor system 10. This later information transfer capability is used for autoconfiguration, in addition to general diagnostic functions. The DATA field of the information packet shown in FIG. 2B contains the 16 word (32 bytes) IPB packet of FIG. 3.

Another special command character in the protocol used on the fiber optic link is a NAK command character. A NAK can be inserted anywhere within a data stream, and is used to stop the transmitting section of DTSs 34, 36 when a receiving DTS is unable to receive the packet being communicated. The NAK works by being received by a fiber optic receiver, which then notifies the fiber optic transmitter of the need to terminate the current fiber optic communication.

Channels:

Data transfers between sections is handled, by each of the DTS pairs 34, 36, via "channels" (FIG. 4a): one is responsible for receiving data and getting that data to the associated IPB 20, 22; the other (channel 80) is responsible for picking up IPB packets from the IPB, destined for processor units P located in other sections, and transmitting that packet on a fiber optic link (as an information packet). Thus, each DTS (e.g., 34a) is made up of a fiber-to-IPB (a fiber optic receive) channel and an IPB-to-fiber (a fiber optic transmit) channel. Except for a shared buffer memory and a few shared control signals between the fiber optic transmitter and the fiber optic receiver, each channel operates independently. This sharing of signals is required to allow flow control along the individual optic fibers which are intrinsically unidirectional.

As indicated above, all DTSs 34a, 34b, 36a, 36b are of substantially identical design. Accordingly, a description of the LEFT DTS 34a shall apply equally to all other DTSs, unless otherwise indicated.

Figure 4B:
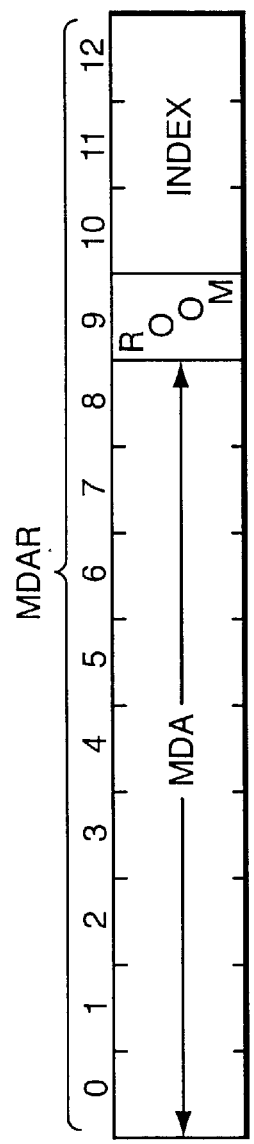
FIG. 4B is an illustration of the memory address used to access the memory locations of the buffer memory shown in FIG. 4A.
Figure 4A:
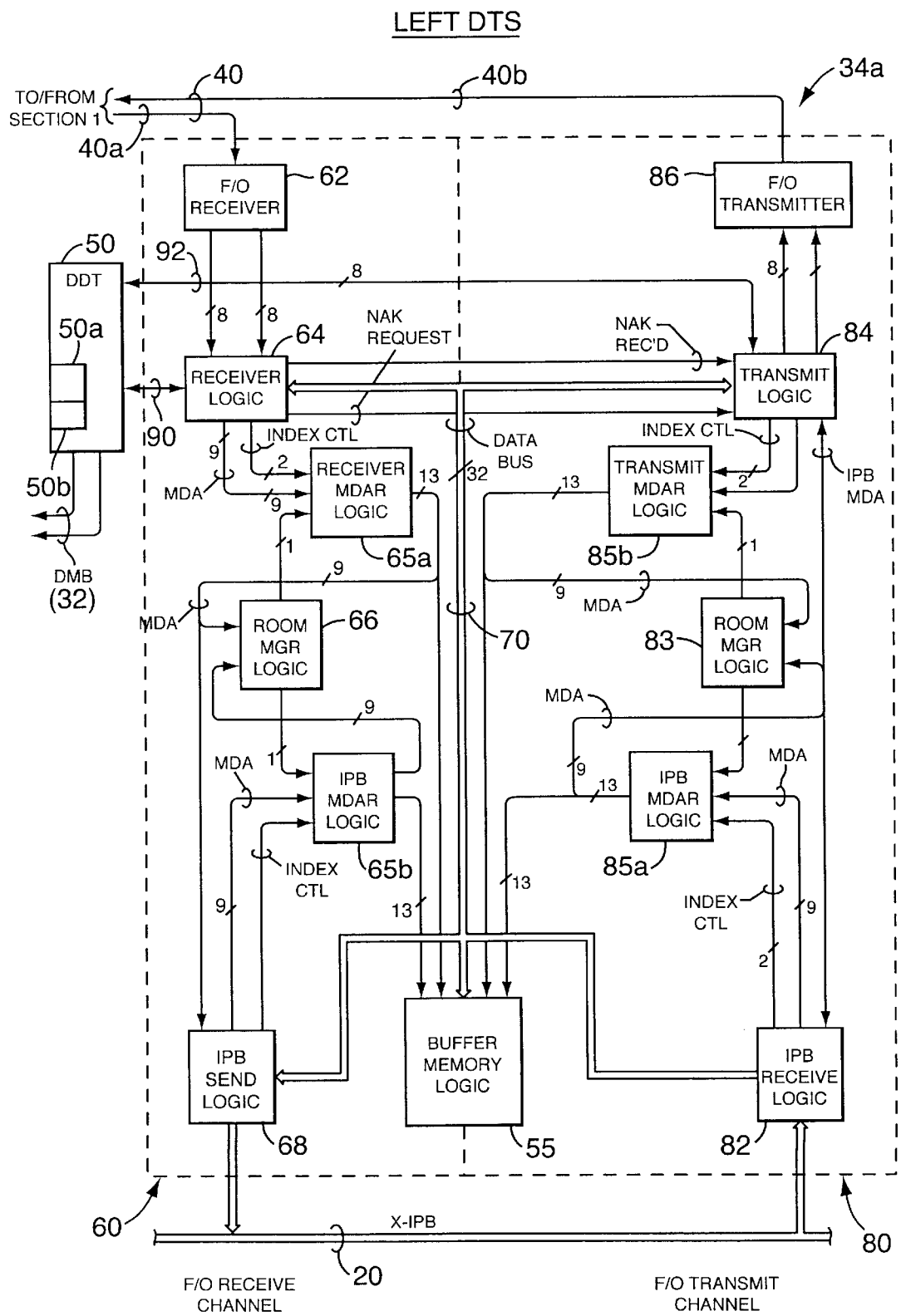
FIG. 4A is a simplified block diagram of one of the data transfer sections shown in FIG. 2 used to connect an interprocessor bus to the communications link.

Referring now to FIG. 4A, shown is the LEFT DTS 34a of the data transfer section 34. The LEFT DTS 34a is coupled to the fiber optic link 40, comprising the optical fibers 40a and 40b for receiving information packets from, and transmitting information packets to, section 1. Information packets received by the LEFT DTS 34a may be bound for a destination processor P in the section with which the LEFT DTS 34a is associated (i.e., section 2), or for a processor unit P in another section. For example, and with reference for the moment to FIG. 1, an IPB packet generated by a processor P (comprising one or more IPB packets) for a destination processor unit P in section 3 will need to be transmitted through one of the intervening sections 2 or 4. Assuming that the intervening section is section 2, the information packet(s) transmitted by section 1 will be received by the LEFT DTS 14a, transferred to the IPB 20, where it will be picked up by the RIGHT DTS 34*b* (FIG. 2A), and communicated to section 3 via the fiber optic link 44. In section 3 it will be received by a DTS essentially identical to the structure of the LEFT DTS 34*a* illustrated in FIG. 4A, and transferred to the corresponding IPB as an IPB packet, where it will ultimately be received by the destination processor P.

Incoming information packets, as FIG. 4*a* shows, are received by a fiber optic (F/O) receiver 62 of a F/O receive channel 60 of the LEFT DTS 34*a*. Outgoing information packets are picked up from the IPB 20 and transmitted on the optical fiber 40*b* by the fiber optic (F/O) transmit channel 80 of the LEFT DTS 34*a*.

Focusing for now on the F/O receive channel 60, the received information packet is communicated by the F/O receiver 62 to receiver logic 64. The receiver logic 64 examines the initial portions of the information packet to determine its type (i.e., whether SOT or KSOT, indicating interprocessor or intraprocessor system communication, or whether it is a DSOT, indicating a DDT packet) and the identification of the destination processor unit P. From this information a 9-bit memory destination address (MDA) is formed and communicated to a receiver MDAR logic unit 65*a*.

The F/O receive and transmit channels 60, 80 share a buffer memory logic unit 55. Received information packets are stripped of their control characters to leave the contained IPB packet, which is stored in the buffer memory logic 55 at a location corresponding to the destination processor unit P.

Digressing for a moment, it will be evident to those skilled in the art that the number of processor units P of the processor system 10 (FIG. 1) can be any number within reason. Similarly, through the FOX connection, the number of processor systems 10 networked to one another is also arbitrary. However, in a preferred embodiment of the invention, there is a maximum of 14 processor systems 10 networked to one another via the FOX connection 33, and the number of processor units P of each processor system 10 is limited to 16. Thus, a fully networked system of processor systems 10 can have a total of 224 potential destinations (16 processors per system×14 systems).

Returning to FIG. 4*a*, the transfer of IPB packets, either from the fiber optic link 40 to the IPB 20, or from the IPB 20 to the fiber optic link 40 (in the case of the LEFT DTS 34*a*) must be temporarily stored to take into consideration such factors as other traffic on the IPB or fiber optic channel 40. Thus, storage in the form of buffer memory logic 55 is provided with sufficient storage capacity for 224 IPB packets. In addition, in the preferred embodiment of the invention, the buffer memory logic 55 capacity is sufficient for storing two IPB packets for each destination processor unit P: that is, the buffer memory logic 55 is capable of storing at least 448 IPB packets. Therefore, the total memory size of the buffer memory logic 55 should be at least 8K (8192) words.

A packet's worth of storage in the buffer memory logic 55 is called a "room," and each destination processor unit P is associated with a pair of such rooms. Each pair of rooms is pointed to by a 13-bit Modified Destination Room Address (MDAR), illustrated in FIG. 4B.

As FIG. 4B shows, each MDAR is composed of 3 fields: a 9-bit field (bits 0–8) contains the MDA; a 1-bit field (BIT 9 of the MDAR) is reserved for the room ID (i.e., which of 2 Rooms); and a 3-bit field (bits 10–12 of the MDAR) is an index used to access each of the eight 32-bit double words that form the IPB packet as stored. The MDA is derived from the routing word (FIG. 3) of the IPB packet, together with information (also contained in the routing word) as to whether or not the packet was received, or is to be communicated, via the FOX interface 33. The Room is assigned by the DTS. Thus, the MDA and Room fields of the MDAR point to that block of memory locations of the buffer memory logic 55 for storing an IPB packet bound for the corresponding destination processor. The index field provides the location of each 32-bit double word of that IPB packet. (The sixteen 16-bit word IPB packet is stored in the buffer memory logic 55 as eight 32-bit double words.)

Continuing with FIG. 4A, it is seen that the receiver logic 64 develops an index control (INDEX CTL) signal that is communicated to the receiver MDAR logic 65*a*, which is used to develop the index information of the field of the MDAR, as will be seen below.

The receiver MDAR logic 65*a* communicates the 13-bit MDAR to the buffer memory logic 55. The 9-bit MDA field of the MDAR is also coupled to a room manager logic 66, which uses the MDA to identify which Room (of the pair) is to receive the incoming IPB packet. A 1-bit indication of the Room is returned by the room manager logic 66 to the receiver MDAR logic 65*a*.

The received IPB packet is communicated by the receiver logic 64 to the buffer memory logic 55, via a 32-bit data bus 70, as 32-bit double-words.

The MDA from the receiver MDAR logic 65*a* is also coupled to an IPB send logic 68, where it is temporarily stored. When the F/O receive channel 60 gains access to the IPB 20, the IPB send logic 68 uses the temporarily stored MDA to access the corresponding IPB packet to transfer it to the IPB 20. For this task, the IPB send logic utilizes an IPB MDAR logic 65*b*, in conjunction with the Room manager logic 66, to develop the 13-bit MDAR associated with the IPB packet to be transferred to the IPB 20. As will be seen, design and operation of the receiver MDAR 65*a* and IPB MDAR 65*b* are essentially identical (as are that of the IPB MDAR 85*a* and Transmit MDAR 85*b* of the F/O transmit channel 80).

Briefly, operation of the F/O receive channel 60 of the LEFT DTS 34*a* is as follows: Information packets, containing the IPB packets, are communicated to the F/O receiver 62 by the optical fiber 40*a* to the F/O receiver 62.

As hereinbefore indicated, the fiberoptic receiver 62 is principally implemented using the receiver portion of the AMD chip set to receive the serial information communicated on the optic fiber 40*a*, and transmit it to a receiver logic 64 as 8-bit bytes.

The receiver logic 64 is responsible for developing the MDA, deriving it from the SOT (or KSOT) character that precedes the data of the packet (FIG. 2B).

The received serial data is converted to bytes, that are transferred to the receiver logic 64 which, in conjunction with the receiver MDAR logic 65*a* and Room manager logic 66, create the 13-bit MDAR that is used as the address to identify the location at which the IPB packet is stored in the buffer memory logic 55. The IPB send logic 68 is then notified that an incoming IPB packet has been stored in the buffer memory logic 55, and is supplied with the MDA of that packet.

When the IPB send logic 68 is able to gain access to the IPB 20, it will then use the MDA supplied it by the receiver MDAR, logic 65*a*, and in conjunction with the IPB MDAR logic 65*b* and Room manager logic 66, retrieve the IPB packet from the buffer memory logic 55 and communicate it on the IPB bus 20.

If the IPB packet communicated by the IPB send logic 68 on the IPB 20 identifies, in the routing word of that packet, a processor unit P of section 2, (the section containing this LEFT DTS 34*a*) that processor unit will pick up the IPB packet. If the routing word identifies any other processor unit P, the F/O transmit channel 80 of the RIGHT DTS 34*b* (FIG. 2*a*) will pick up that IPB packet for transmission to a right neighboring section (in the same manner that it will pick up IPB packets communicated by processor units P of this section).

Continuing with FIG. 4A, the F/O transmit channel 80 is shown as including an IPB receive logic 82 that monitors the IPB 20 to receive those IPB packets bound for processor units P outside the associated section. The IPB receive logic 82 will examine the routing word and, in the same manner as receiver logic 64, will develop a 13-bit MDAR using IPB MDAR logic 85*a* and Room manager logic 83, communicate to the IPB MDAR logic 85*a* a 9-bit MDA developed from the routing word of the received IPB packet. The IPB receive logic 82 also provides an INDEX CTL signal that is coupled to the IPB MDAR logic 85*a* to supply the index portion of the MDAR (see FIG. 4B).

The MDA developed by the IPB receive logic 82 is temporarily held by the IPB MDAR logic 85*a* from which it is applied to Room manager logic 83. The Room manager logic 83 responds with a 1-bit indication of which Room the incoming packet will be stored. This 1-bit indication, as before, forms a part of the MDAR that is used to address the buffer memory logic 55 to write the received IPB packet.

The 9-bit MDA field is also coupled and temporarily held (by the IPB MDAR logic 85*a*) applied to transmit logic 84, where it is temporarily stored (in the same fashion as the IPB send logic 68 stores MDAs). The IPB packet subsequently will be transmitted on the optical fiber 40*b* by the transmit logic 84, which uses the MDA to develop an MDAR to retrieve the IPB packet from the buffer memory logic 55. Again, transfer of the IPB packet to buffer memory 55 from the IPB receive logic 82, as well as from the buffer memory logic 55 to the transmit logic 84, is via the (shared) data bus 70.

It may occur that the two packet locations corresponding to a destination processor P are both used when the F/O receive channel 60 receives an information packet containing an IPB packet for that same processor unit P. Since there is no longer any available room for that IPB packet, the receiver logic 64 will communicate a NAK REQUEST signal to the transmit logic 84. In response, the transmit logic 84 will generate a 8-bit NAK character that will be transmitted by the F/O transmitter 86 to the corresponding DTS of section 1, terminating transmission of section 1. In similar fashion, if the transmit logic 84 is transmitting an information packet on the optical fiber 40*b* to section 1, and there is no room in section 1 for storing the IPB packet contained in the transmitted information packet, the receiving DTS of section 1 will communicate on the optical fiber 40*a* a NAK character that is received, through the F/O receiver 62, by the receiver logic 64. Receiver logic 64 will generate a NAK REC'D signal that is coupled to the transmit logic 84, causing it to terminate transmission of the then outgoing information packet for re-sending later.

Or, similarly, it may be that both Rooms for a particular destination processor unit P are filled when yet another IPB packet bound for that processor unit is received from the IPB 20. In this case the IPB receive logic 82 issues a NAK that is placed on the IPB 20, indicating that the attempted communication of the IPB packet failed.

The DDT 50 associated with the LEFT DTS 34*a* (as well as the RIGHT DTS 34*b*) also uses the fiber optic links 40 and 44 (FIG. 2), to communicate with the DDTs 50 of other sections, as noted, for auto configuration and general diagnostic functions. For this reason two 8-bit buses 90 and 92 are coupled between the DDT 50 and receiver logic 64 and transmit logic 84. A DDT information packet transmitted on the communication link 26 begins with its own (DSOT) character that is unique from those of the IPB or FOX style characters. The DSOT character for the DDT information packet uses the AMD chip set command signal, allowing the DDT packets to be recognized and handled differently from other (i.e., IPB or FOX) information packets.

Following the DSOT character of a DDT packet will be a count of the number of bytes in the DDT information packet. Unlike IPB information packets, DDT information packets can have a variable length up to 126 bytes of DATA. The data is followed by a single byte checksum for error detection, and then an EOT character to frame the packet.

Fiber Optic (F/0) Receive Channel

Figure 5A:
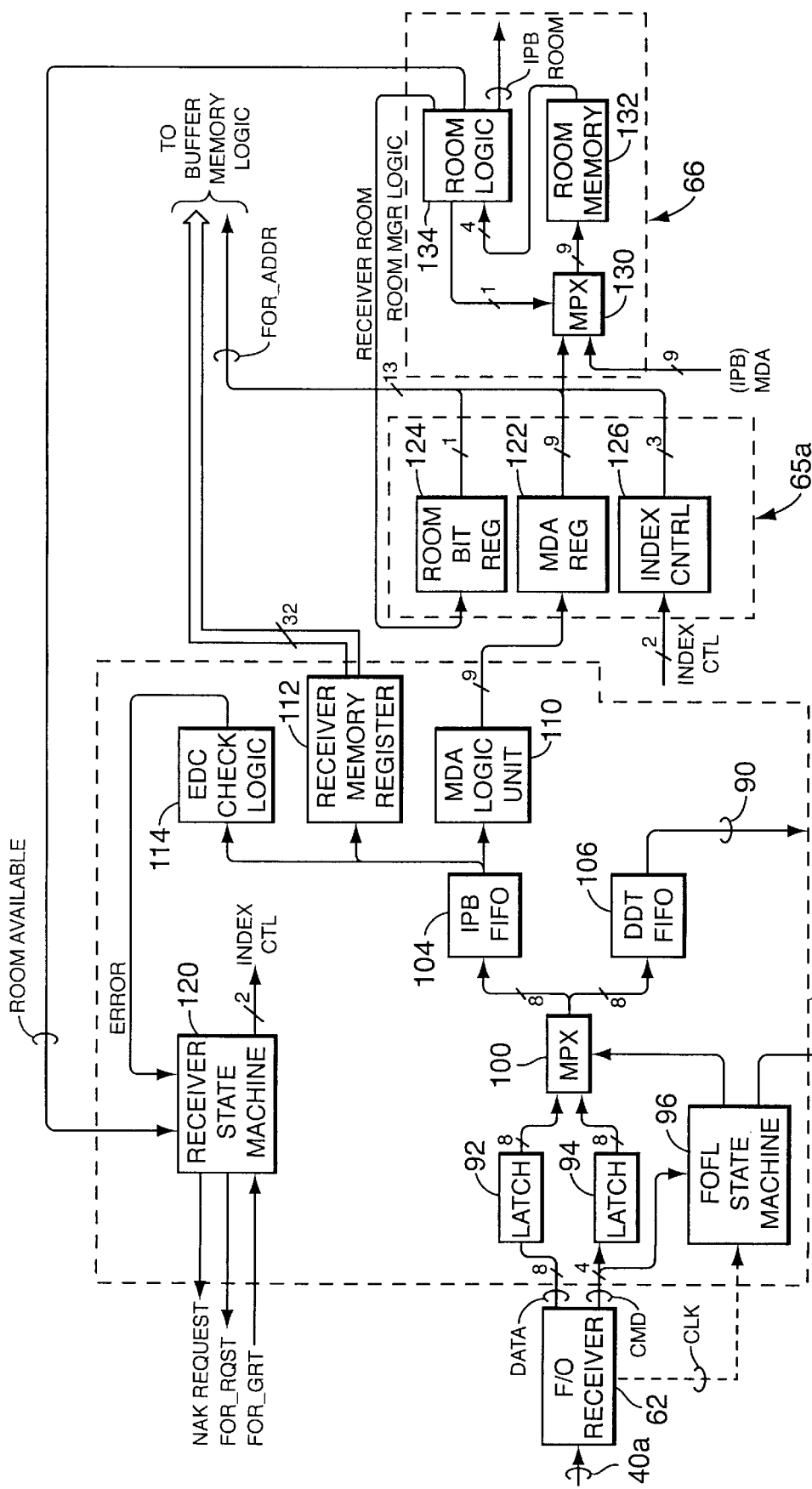
FIGS. 5A and 5B illustrate, in simplified block diagram, the fiber optic receiver channel of the data transfer section shown in FIG. 4A.
Figure 5B:
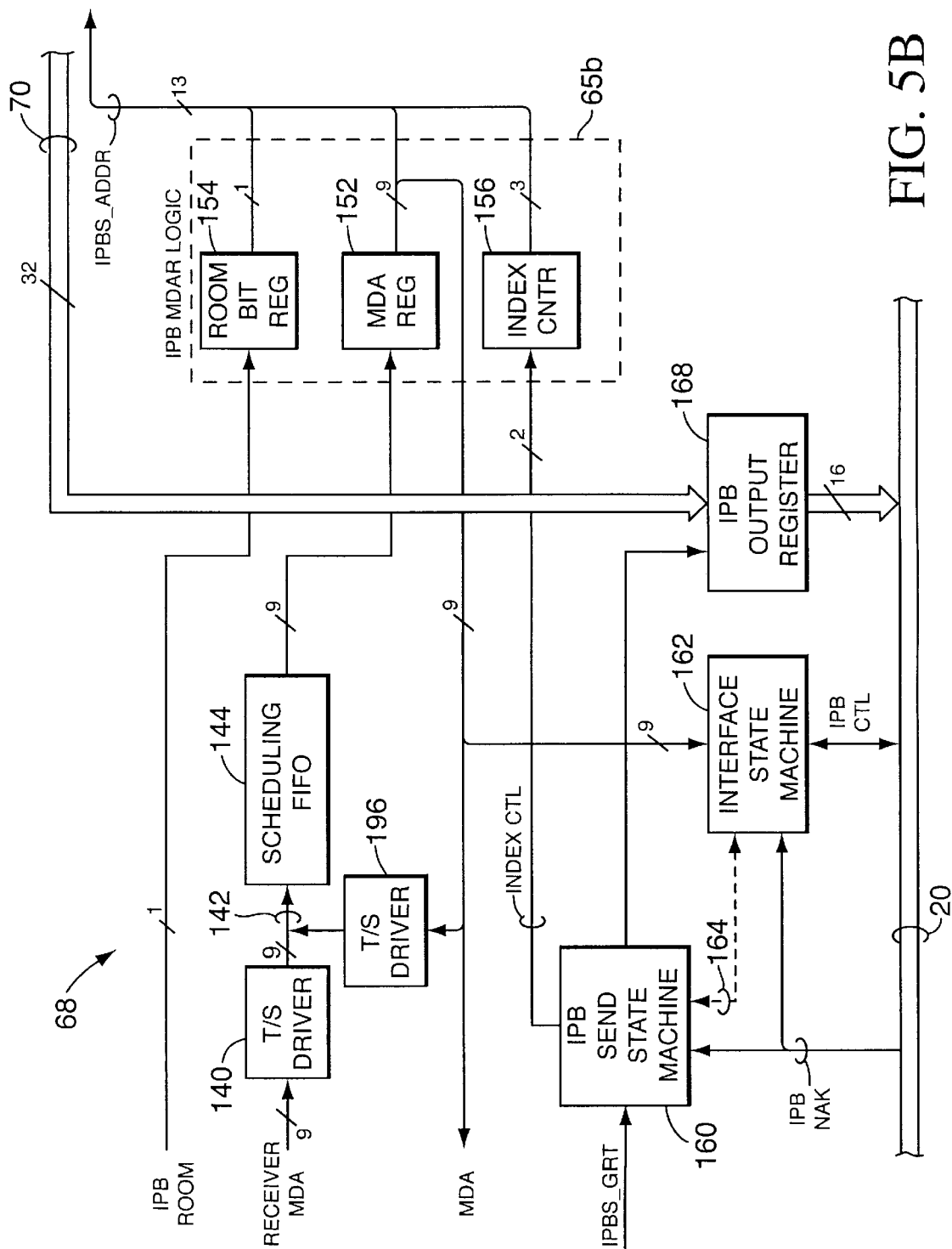

Turning now to FIGS. 5A and 5B, the F/O receive channel 60 is illustrated in greater detail. The F/O receiver 62 receives serial transmissions on the optical fiber 40*a* in FDDI 4B/5B coded form. It assembles, from the received serial information, 8-bit bytes that are communicated to the latches 92, 94, depending upon whether the byte contains data (latch 92) or command information (latch 94). The SOT, DSOT, etc., characters are treated as commands and separated for passage to the latch 94 path by the F/O receiver 62. The data and EDC characters of the information packet are passed to the latch 92.

One or the other of the latches 92, 94 are selected by a multiplex (MPX) 100 for application to an IPB First-In-First-Out (FIFO) storage unit 104 or a DDT FIFO 106. The DDT FIFO 106 is for command and data information bound for the DDT 50. If the incoming information packet contains an IPB packet (as identified by the SOT or KSOT character), the contained IPB packet will be coupled to the IPB FIFO 104. The MPX 100 selects latch 94 only when the incoming information is command information. In that case, the selected command character (e.g., SOT, KSOT, DSOT) is applied to the IPB and DDT FIFOs 104, 106. Which FIFO accepts the command character depends upon whether the incoming packet is bound for the DDT 50 or the IPB 20. That, in turn, is determined by the FOFL state machine 96. It is the fiber optic filter (FOFL) state machine 96, which is also supplied with the incoming command character, that performs the selection. In addition, in the event that a NAK character is received by the F/O receiver 62, it is treated as a command character and applied to the FOFL state machine 96, which generates the NAK REC'D signal that is applied to the transmit logic 84 (FIG. 4A) to terminate a then ongoing transmission.

The data transmitted on the optical fiber 40*a* is coded to include a clock signal. That clock signal is extracted by the F/O receiver 62 for use by elements of the receiver logic 64, such as the FOFL state machine 96, for synchronous operation.

Receiver logic 64 includes an MDA logic unit 110 that is coupled to the output of the IPB at FIFO 104 to receive the routing word of the IPB packet. The MDA logic unit 110 develops, from the routing word, the MDA that is coupled to the receiver MDAR logic 65*a*.

The output of the IPB FIFO 104 is also coupled to a receiver memory register 112. The receiver memory register 112 assembles the 8-bit bytes in 32-bit double words that are written to the buffer memory logic 55 via the data bus 70.

An EDC check logic unit 114 receives the EDC field of the IPB packet and checks against it an EDC quantity that it has calculated during receipt of the IPB packet. If the comparison indicates that no error in transmission has occurred, the EDC check logic 114 will do nothing; if an error in transmission is detected, the EDC check logic 114 will generate an ERROR signal that is communicated to the receiver state machine 120. The receiver state machine 120 will, in effect, drop the received IPB packet by not "scheduling" it with the IPB send logic 68.

The receiver state machine 120, which generates the necessary control signals for the elements of the receiver logic 64, receives a ROOM AVAILABLE signal from the Room manager logic 66, indicating, when asserted, that storage is available in the buffer memory logic 55 for the incoming IPB packet. If, after the MDA is computed and applied to the Room manager logic 66, the ROOM AVAILABLE signal is not asserted, the receiver state machine 120 will generate the NAK REQUEST signal that indicates no room is available, and cause the transmit logic 84 to generate a NAK character via the F/O transmitter 86.

The receiver state machine 120 also generates a memory request signal (FOR_RQST) that is applied to the buffer memory logic 55 (FIGS. 5 and 7) to request access to the memory circuits for writing the incoming IPB packet. The buffer memory logic 55 will, in turn, return a grant signal (FOR_GRT), indicating that the request has been granted.

The receiver MDAR logic 65a includes an MDA register 122 that receives and temporarily stores the MDA computed by the MDA logic unit 110. Also included in the receiver MDAR logic 65a is a 1-bit Room register 124 for storing the 1-bit Room identifier provided by the room manager logic 66. Finally, the receiver MDAR logic 65a includes an index counter 26 that receives the INDEX CTL signal provided by the receiver state machine 120. In response to the INDEX CTL signal, the index counter 126 generates the INDEX field of the MDAR.

As FIG. 5A indicates, the outputs of the MDA register 122, the Room bit register 124, and the index counter 126 combine to provide the 13-bit MDAR that is applied to the buffer memory logic 55 to identify where an incoming IPB packet will be stored. In addition, the 9-bit output of the MDA register 122 is communicated to the Room manager logic 66, where it is received by a multiplex (MPX) circuit 130. The MPX 130 also receives the 9-bit MDA from the IPB send logic 68 (FIG. 4A). The output of the MPX 130 is applied to a room memory 132 which stores, for each different MDA a 4-bit quantity which will be described more fully below. This 4-bit quantity is coupled to room logic 134 which supplies therefrom a room identifier (RECEIVER ROOM) that is stored in the Room Bit Register 124. The Room logic also determines, from the accessed 4-bit value, the ROOM AVAILABLE signal coupled to the receiver state machine 120.

It may be advantageous at this time to pause for a moment and explore more thoroughly the "Room" concept of the present invention. As indicated, the room memory 132 of the Room management logic 166 contains, for each MDA, a 4-bit quantity. Two of those bits (bit 0 and bit 1) provide the room status for each such Room: when SET, the Room is occupied; when not SET, the Room is available. A third bit of the 4-bit quantity is a Room bit that indicates which room and IPB packet will be taken from, or which room an IPB packet will be written to. The fourth bit is parity. Illustrated, below, in Table I is a logic truth table illustrating the Room concept.

TABLE I

| BIT0 | BIT1 | ROOM BIT | WRITE TO | READ FROM |
|---|---|---|---|---|
| 0 | 0 | 0 | ROOM 0 | ROOM 0 |
| 0 | 0 | 1 | ROOM 1 | ROOM 1 |
| 0 | 1 | — | ILLEGAL | CONDITION |
| 0 | 1 | 1 | ROOM 0 | ROOM 1 |
| 1 | 0 | 0 | ROOM 1 | ROOM 0 |
| 1 | 0 | — | ILLEGAL | CONDITION |
| 1 | 1 | 0 | NONE | ROOM 0 |
| 1 | 1 | 1 | NONE | ROOM 1 |

Referring to Table I, "Bit0" and "Bit1" respectively signify the state of each the two Rooms, i.e., whether empty or not. A "1" identifies the corresponding room as containing an IPB packet; a "0" indicates the Room is empty and available to receive a packet. The "Room Bit" of Table 1 points to the Room (0 or 1) to be read if an IPB packet is to be retrieved from the buffer memory logic 55. When both Rooms are empty (i.e., Bit0=0 and Bit1=0), the Room Bit determines which Room receives the incoming IPB packet. When one of the Rooms contains an IPB packet, Bit0 and Bit1 are examined to determine which of the two Rooms is available (if any), and the incoming IPB packet will be written to this available (empty) Room. The "Write To" or "Read From" are the 1-bit values developed from the Bit0, Bit1, and Room Bit states by the Room manager logic 66; and they are the 1-bit values delivered by the Room manager logic 66 (1) to the receiver MDAR logic 65a and (2) to IPB MDAR logic 65b of the P/O receive channel (see FIG. 4A), respectively, to join in forming the 13-bit MDAR address of each.

The same is true for the F/O transmit channel 80: As will be seen, the Room manager logic 83 (FIGS. 4A and 6) is structured and operatively identical to Room manager 66. The 1-bit values Room manager logic 83 delivers to the IPB MDAR logic 85a and transmit MDAR logic 956 are the Write To (in the case of writing an IPB packet to the buffer memory logic 55) or Read From (when reading from the buffer memory logic 55) values that are developed from the Bit0, Bit1, and Room Bit states.

Sequentiality of IPB packets is maintained by the use of this Room concept. Specifically, it is the Room Bit that maintains this packet sequentiality. Before writing an IPB packet to the buffer memory logic 55, the receiver logic 64 presents, via the receiver MDAR logic 65a, the MDA to the room manager logic 66. The room manager logic 66 uses the MDA to address the room memory 132 (FIG. 5A) and, based upon the truth table (Table I), above, returns to the receiver MDAR logic 65a the 1-bit quantity identifying which room to use. Alternatively, in the event that the Bits 0 and 1 are both 1, 1, the room logic 134 will return to the receiver state machine 120 an indication that no room is available, by nonassertion of the ROOM AVAILABLE signal.

When the receiver logic 64 has written an IPB packet to the buffer memory logic 55 (FIG. 4A), at the address specified by the MDA, and the resultant room bit provided by the room manager logic 66, the receiver logic 64 informs the room manager logic 66 that the room previously specified has now been filled. The bit representing the previously empty Room is then set to a 1 to indicate that it now contains an IPB packet.

If an IPB packet is to be retrieved (having been previously received and stored by the receiver logic 64) from the buffer memory logic 55, essentially the same operation is performed. The IPB send logic 68 (FIGS. 4A and 5B) will generate an MDA (in a manner to be described) that is applied to the IPB MDAR logic 65b and to the room manager logic 66, in the same manner as described above. The room manager logic 66 will, in turn, provide the 1-bit Room indicator, pointing to the Room in buffer memory logic 55 corresponding to the applied MDA, and containing the desired IPB packet. After having used the generated Room Bit and the MDA to address the buffer memory 55 and retrieve the IPB packet for communication on the IPB 20, the IPB send logic 68 so notifies the Room manager logic 66 that the Room is now empty. The Room Bit in the room memory 132 representing that Room is then cleared (set to 0). The Room Bit of the Room memory 132, which identified which one of the two Rooms to send, is then updated by setting it to its opposite state. The updating of the Room Bit is done only when the entire IPB packet has been sent. If for any reason it was not sent, the Room Bit is left unchanged to continue to point to the Room containing the packet yet to be sent.

Returning now to FIGS. 5A and 5B together, FIG. 5B illustrates the IPB send logic 68 and the IPB MDAR logic 65b (FIG. 5B), in greater detail. As can be seen, the IPB MDAR logic 65b is of identical construction to that of the receiver MDAR logic 65a.

The receiver MDA from the receiver MDAR logic 65a is coupled to a tri-state (T/S) driver circuit 140 of the IPB send logic 68, and from there, by a tri-state bus 142, to a scheduling FIFO 144. The output of the scheduling FIFO 144 is coupled to the MDA register 152 of the IPB MDAR logic 65b. The 9-bit output of the MDA register 152, in addition to forming a part of the 13-bit MDAR that addresses the buffer memory logic 55, is coupled back to a tri-state driver 146 which, in turn, couples it to the tri-state bus 142. The output of the MDA register 152 also provides the MDA (IPB) that is coupled to the MPX 130 of the room management logic 66 and used, when selected, to access the room memory 132. The 4-bit quantity accessed from the room memory 132 is coupled to the room logic 134, which produces the 1-bit Room indicator that is returned to the IPB MDAR logic 65b and stored in the Room bit register 154 thereof.

Finally, an index counter 156 is included in the IPB MDAR logic 65b that receives INDEX CTL signals generated by an IPB send state machine 160 to provide the 3-bit index field of the MDAR applied to the buffer memory 55.

The IPB send logic 68 further includes an interface state machine 162 that generates the necessary handshake signals for transferring an IPB packet onto the IPB 20. In the event that a NAK is received while the packet is being transferred, the interface state machine 162 will stop sending the packet onto the IPB 20, and the IPB send state machine 160 will cause the MDA to be returned to the scheduling FIFO 144 to re-schedule the associated IPB packet for a subsequent transfer attempt. As will be evident to those skilled in the art, there is an interlock (i.e., cooperative operation) between the IPB send state machine 160 and the interface state machine 162. This interlock is generally designated by the dotted line 164.

Transfer of the IPB packet from the buffer memory logic 55, on the 32-bit data bus 70, is handled by the IPB output register 168. The IPB output register 168 receives the 32-bit double words, and causes them to communicate in proper order the IPB packet as 16-bit words.

Fiber Optic Transmit Channel

Figure 6:
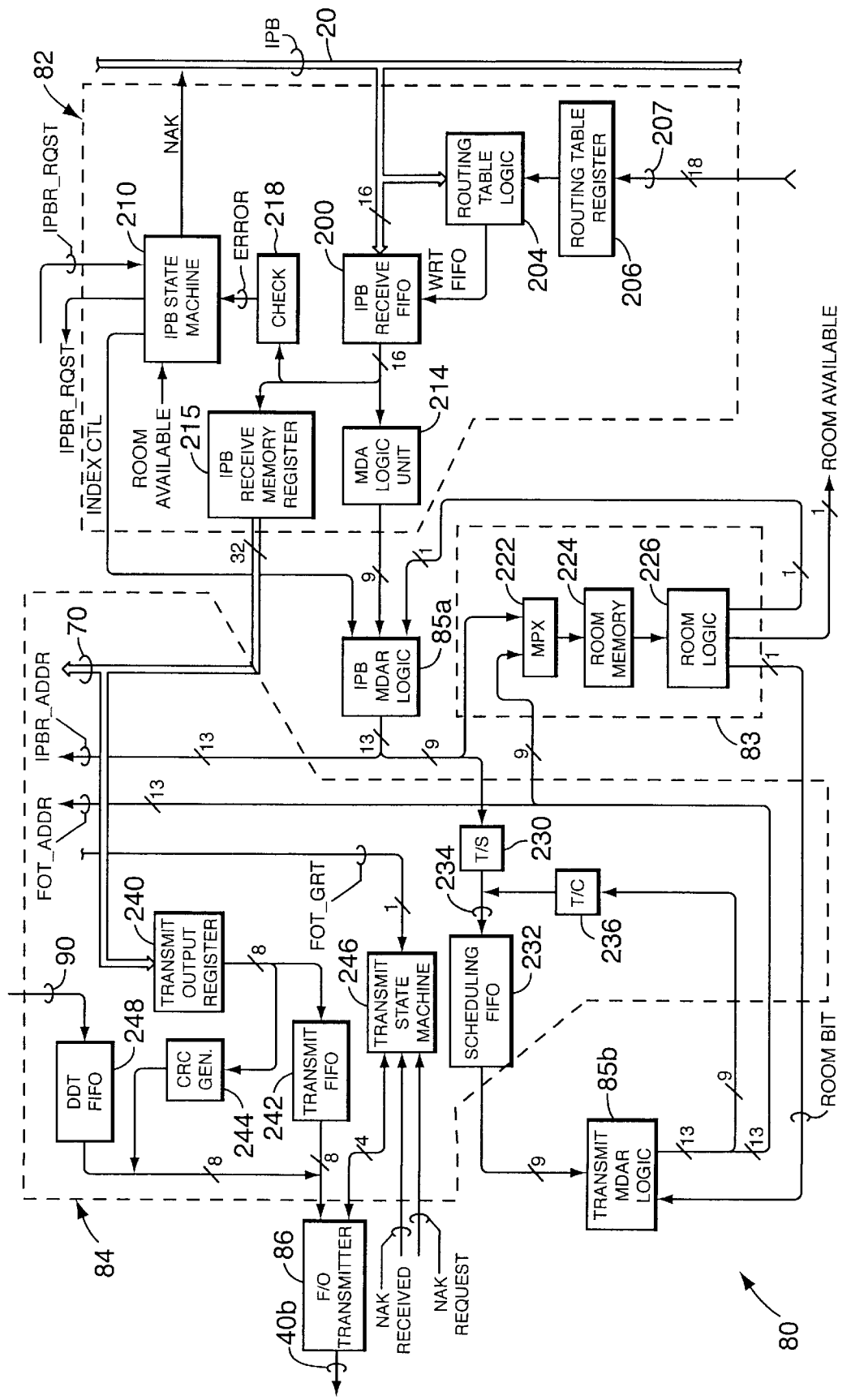
FIG. 6 is a simplified block diagram of the fiber optic transmit channel of the data transfer section of FIG. 4A.

Turning now to FIG. 6, there is illustrated the details of the F/O transmit channel 80. In essence, the operation of the F/O receive channel 60 is substantially the same as the of the F/O transmit channel 80. That is, the operation of receiving an information packet for communication to the IPB 20 is almost the same as receiving an IPB packet from the IPB 20 for transfer to the optical fiber 40b.

As FIG. 6 shows, the IPB receive logic 82 includes an IPB receive FIFO 200, which operates to receive the IPB packets communicated on the IPB. The routing word of the IPB packets is applied to a routing table logic 204, which receives the output of a routing table register 206. The routing table logic compares the routing word of the IPB packet to the information contained in the routing table register 206. The routing table register will contain information indicative of which processor units P are contained in the associated section, and which are in other sections. The routing word is compared against the routing table register. If the routing word of the IPB packet corresponds to a destination processor P of the associated section, the IPB receive logic 82 will do nothing; if, on the other hand, the routing word indicates that the destination processor P is located in another section (or another system, via the FOX connection 33, FIG. 1) the IPB receive FIFO 200 will receive the IPB packet, under control of an IPB state machine 210.

The output of the IPB receive FIFO 200 is communicated to an MDA logic unit 214, which takes the routing word of the IPB packet and computes the MDA which is then supplied by the MDA logic unit to the IPB MDAR register 85a. The IPB packet is also received by the IPB receive memory register 215 which assembles it in 32-bit double words for communication on the data bus 70 to the buffer memory logic 55 for storage.

The IPB packet, as received, is applied to a check circuit 218 which, as each word of the IPB packet is received, computes a checksum. That computed checksum is then compared against the checksum of the packet to ensure that no error has occurred in the transmission on the IPB 20, or via the IPB receive FIFO 200. If an error in transmission has been detected, an ERROR signal will be generated by the CHECK circuit 218 and applied to the IPB state machine 210. The IPB state machine 210 will not pass the MDA to the F\O transmit logic 84 so that the IPB packet will not be scheduled for transmission. In addition, no change will be made to the Room information so that the Room in which the IPB packet was received is considered empty.

The IPB MDAR logic 85a is of identical construction to the receiver MDAR logic 65a (and the IPB MDAR logic 65b). The IPB MDAR logic 85a temporarily holds the MDA computed by the MDA logic unit 214, and communicates that held quantity to the Room manager logic 83, where it is received by a multiplex (MPX) circuit 222 (which also receives an MDA from transmit MDAR logic 85b). The selected by the MPX 222 MDA is applied to a Room memory 224 to access a 4-bit quantity that identifies Room status, as explained above. That quantity is applied, in turn, to Room logic 226 to generate the 1-bit Room identifier for the IPB MDAR logic 85a and the transmit MDAR logic 85b, in the manner described above. In addition, the Room logic 226 will assert a ROOM AVAILABLE signal that is coupled to the IPB state machine 210, to indicate (when asserted) that, indeed, memory location is available for the received IPB packet. Of course, if the ROOM AVAILABLE signal is not asserted, the IPB state machine 210 will return to the IPB 20 a NAK signal indicating that it cannot receive the IPB packet.

The MDA from the IPB MDAR logic 85a is also applied to a tri-state driver 230 of the transmit logic 84, where it is communicated for storage in a scheduling FIFO 232 via a tri-state bus 234. The output of the scheduling FIFO 232 is coupled to the transmit MDAR logic 85*b*, which stores the MDA as needed. The MDA is then returned from the transmit MDAR logic 85*b* to the tri-state bus 234 via tri-state drivers 36 so that, in the event an attempted transmission of the associated packet is terminated prematurely, the packet can be "re-scheduled" by writing the MDA back to the scheduling FIFO 232 for later access.

The data bus 70 is applied to a transmit output register 240 of the transmit logic 84 where the 32-bit double words are parsed and communicated as 8-bit bytes to a transmit FIFO 242, from which it is communicated to the F/O transmitter 86 and applied to the optical fiber 40*b*.

The output of the transmit output register 240 is also applied to a CRC generator which computes, using the cyclic redundancy code generation technique, the EDC that is added as a part of the information packet transmitted on the optical fiber 40*b*. The operation of the transmit logic 84 is under the aegis of a transmit state machine 246, which receives the NAK REC'D and NAK REQUEST signals from the receiver logic 64 to terminate transmission of an information packet (in the case of assertion of the NAK REC'D signal) or transmit a NAK character (in the case of assertion of the NAK REQUEST signal).

The transmit receive logic 84 also includes a DDT FIFO 248 that is operated under control signals (not shown) asserted by the DDT 50 (FIG. 4A). The DDT FIFO 248 receives information from the DDT 50 on the bus 90 for transmission as a DDT information packet that is also transmitted via the F/O transmitter 86.

Figure 7:
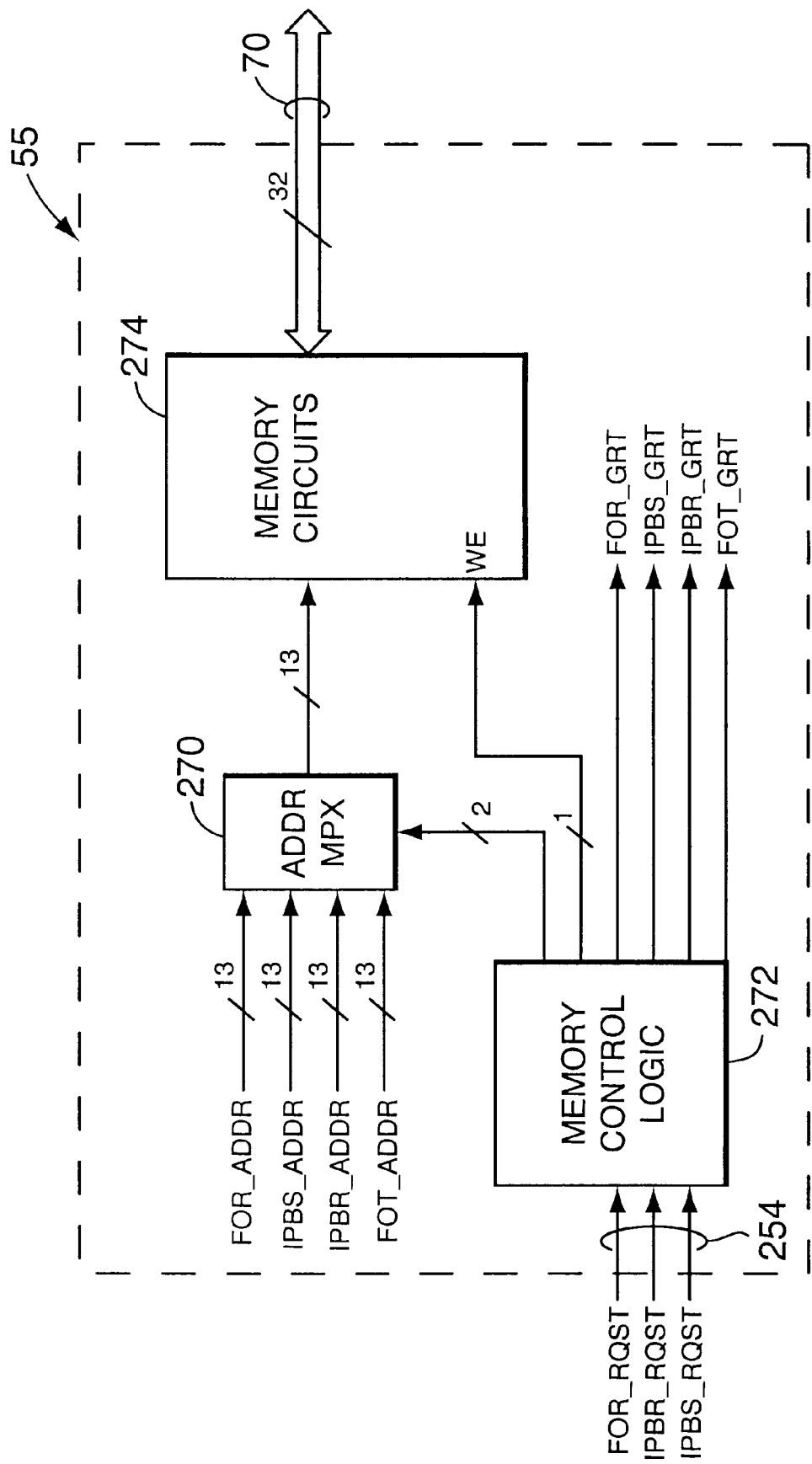
FIG. 7 is an illustration of the buffer memory logic circuit used by the fiber optic receive and transmit channels of FIGS. 5 and 6, respectively, to store received packets, and packets to be transmitted.

Before continuing with FIG. 6, it will be advantageous to understand operation of the buffer memory logic 55, which is illustrated in FIG. 7 in simplified block diagram form. As shown, the buffer memory manager logic 55 includes an address multiplex circuit 270, and memory control logic 272. The address multiplex circuit 270 receives four separate addresses from the four sections interested in gaining access to the buffer memory logic 55: the receiver logic 64, the IPB send logic 68, the IPB receive logic 82, and the transmit logic 84 (FIG. 4A), respectively shown as the 13-bit addresses FOR_ADDR, IPBS_ADDR, IPBR_ADDR and FOT_ADDR. The addresses are accompanied by a memory request signals FOR_RQST, IPBR_RSQT, and IPBS_RQST communicated on signal lines 254 to the memory control logic 272. These request signals are respectively from the Receiver state machine 120 (FIG. 5A), the IPB state machine 210 (FIG. 6), and the IPB send machine 160 (FIG. 5B). The memory control logic 272 will respond with one of the "grant" signals FOR_GRT, IPBS_GRT, IPBR_GRT, or FOT_GRT, signifying a grant of access to the memory circuits 274. The memory control logic 272 operates to select an address in a modified round robin fashion in which the fiber optic receiver (FOR) logic 64 and the transmit (FOT) logic 84 are given memory access every four cycles, and the IPB send (IPBS) or receive (IPBR) logic 68, 82 are given access to the memory every other cycle. Thus, the access cycle looks as follows:

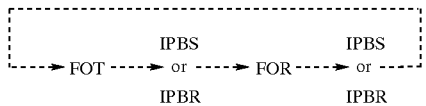

When the IPB receive logic 82 requests a memory access, it will continue to get every other cycle until the IPB packet is moved from the IPB 20 to the memory circuit 57 where it is stored. The same occurs for the IPB send logic 68, which will continue to get every other cycle until the IPB packet is retrieved from the buffer memory logic 55 and sent on the IPB 20. In the case of a tie request to memory, the IPB send logic 64 is given priority.

Figure 2A:
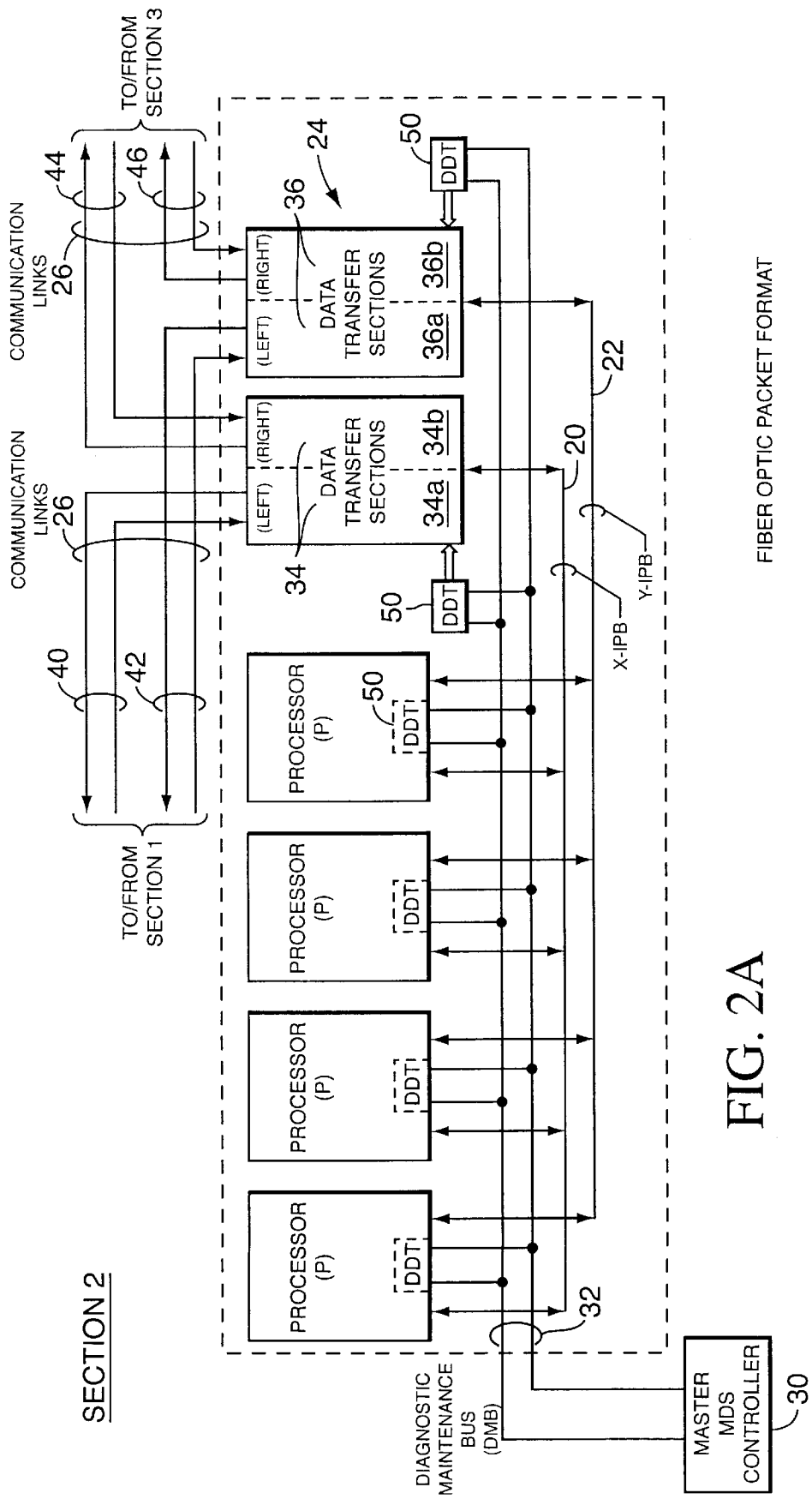
FIG. 2a is a simplified block diagram illustration of one of the multiprocessor sections containing the interconnect unit used to couple the interprocessor bus of the section to the communications link.
Figure 2B:
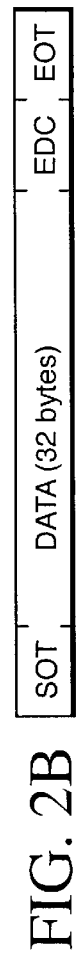
FIG. 2b is an illustration of the content and structure of packets sent via the communications link of FIG. 1.

It should be remembered that there are two separate DTSs 34 (34*a*, 34*b*) coupled to receive IPB packets on the IPB 20, as FIG. 2A illustrates. Each DTS 34*a*, 34*b* can receive IPB packets from, and communicate IPB packets to, the IPB 20. (The same, of course, is the same for the DTSs 36 that connect to the Y-IPB 22.) As explained above, a single DTS is responsible for communication with either a left neighbor (e.g., LEFT DTS 34*a*) or a right neighbor (e.g., RIGHT DTS 34*b*). Thus, each of the DTSs, being identically formed, will include a F/O transmit channel 80.

Returning to FIG. 6, the routing table 206 is an 18-bit register capable of being written by the DDT 50 via signal lines 207; the information it holds is used to determine the direction of routing for information packets bound for out-of-section processor units P. The information contained in the routing table 206 also determines whether an IPB packet should be accepted from the IPB 20. Upon power-up, the DDT 50 performs an autoconfiguration algorithm, which will be explained more fully below, to determine the correct values for the routing table 206 (and those of other DTSs) and writes them. The routing table 206 is then used by IPB receive logic 82, via the routing table logic 204, to accept or ignore traffic over the IPB 20.

The information required by the IPB receive logic 82, as indicated above, to make a determination, is obtained from the routing word of the IPB packets transmitted on the IPB 20.

Of the 18 bits contained in the routing table 206, 16 correspond to the 16 processor units that can form a processor system 10, assuming that the processor system 10 contains a maximum of 16 processor units P. There is no limitation imposed by the invention as to how many processor units can be used in a system 10. The two remaining bits correspond to presence or absence of a POX 13 connection.

As indicated above, the operation of the F/O transmit channel 80 is much the same as that of the F/O receive channel 60. IPB packets communicated on the IPB 20 destined for processor units P that are not located in the section with which the F/O transmit channel is associated are picked up by the IPB receive FIFO 200. Under control of the IPB state machine, the routing word of the packet is applied to the MDA logic unit 214, communicated as the computed MDA to the IPB MDAR logic 85*a* and applied to the Room management logic 83 to obtain the associated Room bit. The MDA and Room bits combine with the index generated internal of the IPB MDAR logic 85*a* (in response to the index CTL signals from the IPB state machine 210) generate the IPB_ADDR address to store the incoming IPB packet in the buffer memory logic 55. The IPB packet is then "scheduled" by storing its MDA in the scheduling FIFO 234.

When the IPB packet is stored, and checked (by check circuit 218), the Room manager logic 83 is notified and the Room data updated accordingly. The transmit logic 84 communicates the MDA, via the scheduling FIFO 232, to the transmit MDAR logic 85*b* which, in turn, also accesses the Room manager logic 83 via the MPX 222. The obtained Room bit, together with an internally generated index, allows the transmit MDAR logic 85*b* to provide the FOT_ADDR address to retrieve the IPB packet, coupling it to the transmit output register 240, which parses it in 8-bit segments for communication via the transmit FIFO 242 and F/O transmitter 86 onto the optical fiber 40*b*.

In the event that, after transmission is initiated, the DTS at the other end of the optical fiber 40*b* cannot receive the information packet, it will generate a NAK that is received by the receiver logic 64, resulting in a NAK REC'D signal. The transmit state machine 246, upon receipt of the NAK REC'D signal, "reschedules" the IPB packet by retrieving the MDA from the transmit MDAR logic 85b via the tri-state drivers 236 for storage in the scheduling FIFO 232. It will then attempt to resend the next IPB packet that has been scheduled to be sent.

Digressing for the moment, assume that the processor 10 has a full compliment of processor units P divided into the four sections 1, . . . 4 illustrated in FIG. 1, each section containing four of the processor units. Assume further that each of the processor units P is given an identification numbers (I.D.) of 0 through 15 that section 1 contains processor units with I.D.'s of 0, 1, 2 and 3; section 2 contains processor units with I.D.'s of 3–7; section 4 contains processor units with I.D.'s of 7–11; and section 4 contains those with I.D.'s of 12–15. Given these assumptions, the routing tables 206 for each of the two DTSs 34a, 34b of section 2 are illustrated in FIG. 8.

It should be noted that there is no requirement that the processor system 10 be limited to four sections, or that specific processor units be contained in specific sections. It will be evident, however, that as the number of sections increases, increasing the average number of inter-section "hops" per packet, problems can be encountered, such as, for example, additional packet latency.

Figure 8:
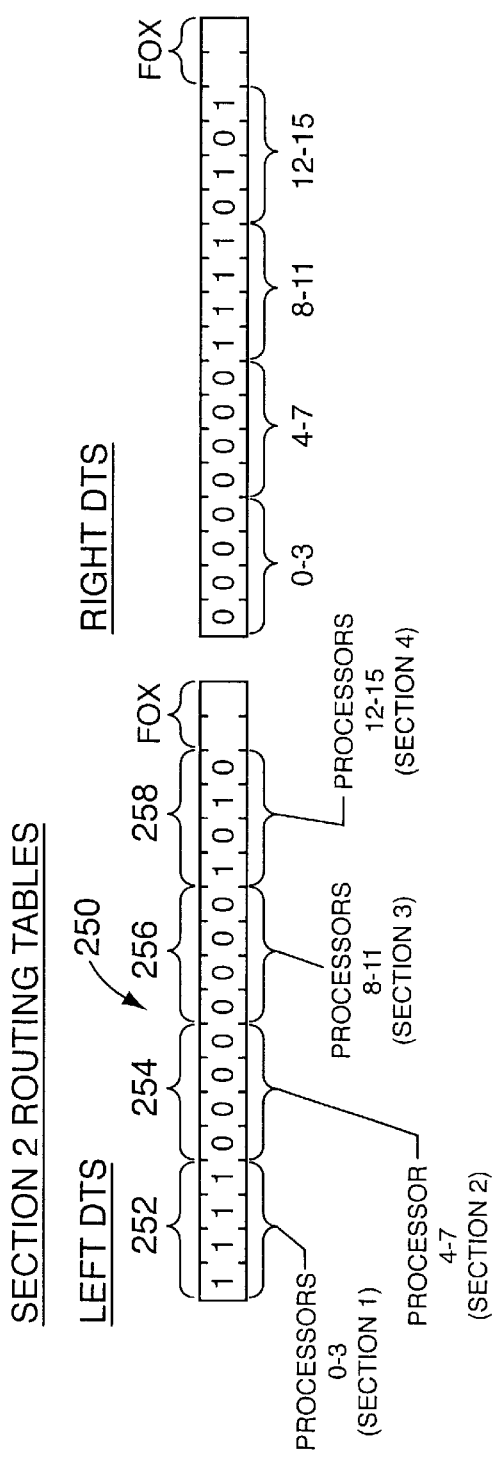
FIG. 8 is an illustration of the routing tables used in the fiber optic transmit channels of FIG. 6.

The content of routing table 206 for the LEFT DTS 34a is shown on the left in FIG. 8, while the routing table content for the RIGHT DTS 34b is shown, appropriately, on the right. Focusing on the routing table content for the LEFT DTS 34a, which is designated generally with the reference numeral 250, the 16 left most (as viewed in FIG. 8) bit positions of the routing table content 250 provide a view of what processor units the LEFT DTS 34a is responsible for transmitting IPB packets to. The four left most bit positions 252 correspond to those processor units contained in section 1. Since all four are present in the processing system 10, under the assumption outlined above, and section 1 is the left most neighbor of section 2, these positions are set to a ONE to indicate that IPB packets destined for the section 1 processor units P should be picked up by the DTS 34a, i.e., the IPB receive logic 82.

The next 4-bit positions 254 correspond to section 2 processors. Since this particular content of routing table identifies section 2 of the processor system 10, packets destined for a processor unit contained in section 2 should not be picked up by the IPB receive logic 82 and, therefore, each of the bit positions corresponding the processor units of section 2 are set to a ZERO. The next four 4-bit positions 256 correspond to the processor units of section 3. Section 3 is the right neighbor of section 2 (see FIGS. 1 and 2A). Thus, in the first instance, it is the right DTS 34b that will be responsible for picking up IPB packets to those processor units having ID's associated with section 3. Note, in fact, that the corresponding bit positions (8–11) of the routing table contents for the RIGHT DTS are set to a ONE.

Finally, the right most 4-bit positions 258 of the 16 bits reserved for processor identification correspond to those processor units having ID's 12–15, which are contained in section 4. Section 4, as can be seen in FIG. 1, is equally distant from section 2; that is (left or right), packets can be routed from section 2 to section 4 through section 3 (right transmission) or section 1 (a left transmission). To distribute packet traffic on the ring for equidistant paths, the routing table 206 is written so that IPB packets bound for even-numbered ID processor units of section 4 will be picked up and sent by the LEFT DTS 34a; those IPB packets destined for the even-numbered ID processor units of section 4 will be picked up and sent by the RIGHT DTS 34b.

IPB packets are transferred from the IPB 20 to the optic fiber 40b in much the same way they were transferred from the optical fiber 40a to the IPB 20. As explained above, those IPB packets destined for processor units contained in section 1, or the odd-ID processors contained in section 4, will be picked up from the IPB 20 by the F/O transmit channel 80.

Scheduling

As has been seen, each IPB packet, whether received from the fiber link (as an information packet) by the F/O receive channel 60 of a DTS, or from IPB by the F/O transmit channel 80, is handled in the same manner: It is received, checked for errors that may have occurred in transmission, stored in the buffer memory logic 55 at a location dictated, in part, by the destination address (i.e., the MDA), and then "scheduled." This scheduling of packets is an important aspect of the present invention, and warrants further discussion. As may have been noted in the forgoing description, the F/O receive and transmit channels 60, 80 handle scheduling in substantially the same manner, with substantially the same circuit means. Therefore, only the following explanation of scheduling need be presented in connection with how IPB packets are received from the IPB 20, stored, and scheduled for transfer by the F/O transmit channel to the optical fiber 40b.

Turning now to the block diagram of the F/O transmit channel 80 of FIG. 6, as discussed above, any IPB packet having a routing word identifying a processor unit not associated section will be picked up by the IPB receive logic 82 and temporarily stored in the IPB FIFO 200. (More accurately, the IPB packet will be picked up if the routing word identifies the processor unit P as being located in another section, and the routing table 206 specifies the DTS as being responsible for the transfer. It may be, for example, that the companion DTS will handle the transfer, depending upon the direction the IPB packet will be sent.)

From the IPB receive FIFO 200 the routing word is transferred to the MDA logic unit to develop the MDA for the packet. The computed MDA is then transferred to the IPB MDAR logic 85a where it will be used to make up a major portion of the address (IPBR_ADDR) for storing the packet. From the IPB MDAR logic 85a the MDA is applied to the Room manager logic 83, and used to develop the 1-bit Room bit value, as described above, that is returned from the Room manager logic 83 to the IPB MDAR logic 85a as another part of the address IPBR_ADDR.

As the IPB packet is received, it will be stored in the buffer memory logic 55. When the checksum portion of the IPB packet is received, it (in addition to being stored) will be checked by the check unit 218. If the checksum is correct, the IPB state machine 210 will cause the MDA to be transmitted to and stored in the scheduling FIFO 232, and the "Room" information updated accordingly to indicate that the Room that received the IPB packet is now being used. If, on the other hand, the check unit 218 determines that an error may have occurred, it will generate an ERROR signal that is communicated to the IPB state machine 210. In turn, the IPB state machine will take no further action respecting the received packet; the MDA will not be transferred to the scheduling FIFO 232, and the Room information will not be updated. In effect, the IPB packet will not be scheduled, and treated as if it were never received.

Assuming that no transmission errors were detected by the check unit 218, and that the IPB packet has now been scheduled for transmission, the following occurs: The scheduling FIFO 232 signals the transmit state machine 246 that is "not empty." This causes the transmit state machine 246 to pull the MDA (first stored, if more than one is in the FIFO) from the FIFO and apply it to the transmit MDAR logic 85b (and from there to the Room manager logic 83) to develop the address FOT_ADDR for accessing the IPB packet associated with the MDA from the buffer memory logic 55. The transmission of the IPB packet can then be performed as described above: The IPB packet is transferred from the buffer memory logic as 32-bit double-words to the transmit output register 240, where the double-words are parsed to 8-bit bytes; each byte is then sequentially transferred to the transmit FIFO 246, and from there passed to the F/O transmitter 86 for application to the optical fiber 40b.

However, if the buffer memory of receiving DTS lacks, for example, an empty Room for the packet, it will return (during transmission of the outgoing packet) a NAK that is received by the F/O receive channel 60. The F/O receive channel 60 alerts the F/O transmit channel, via the NAK REC'D signal, causing the transmit state machine 246 to react by terminating the transfer of data from the transmit FIFO 242 to the F/O transmitter 86, and reloads the MDA (held in the transmit MDAR) back into the scheduling FIFO 232. Noting that the scheduling FIFO 232 is still signaling that it is "not empty," transmission the IPB packet associated with the MDA will again be attempted.

Assume now that during the forgoing attempted transmission, another IPB packet for the same destination processor unit P is received, stored, and scheduled. When the transmission is "NAKed", there will now be two MDAs in the scheduling FIFO 232, both identical. (Remember, when two IPB packets are in the buffer memory logic, bound for the same destination processor unit P, only the Room bit is capable of differentiating between the two.) Since the MDA for the just received IPB packet was loaded first in the scheduling FIFO 246, relative to the MDA associated with the NAKed IPB packet, it will be retrieved and used by the transmit MDAR logic 85b (in conjunction with the Room manager logic 83) to generate the address (FOT_ADDR) used to access the IPB packet from the buffer memory logic 55. Now the importance of the Room bit can be seen. Since the transmission of the first received IPB packet (by the F/O transmit channel) was unsuccessful, the information maintained by the Room manager logic 83 was left unchanged. Thus, the 1-bit value produced by the Room manager logic 83 for the transmit MDAR logic 85b is the same as before. The MDA retrieved will still develop the proper address (FOT_ADDR) to access the first received IPB packet, and not the second received IPB packet.

When the IPB packet has been successfully transmitted, the MDA is not rescheduled and not used again. In addition, the Room manager logic 83 is signalled by the transmit state machine 246 to cause the Room bit to be updated to point to the Room containing the second-received IPB packet.

Since, in our example, the transmit FIFO 232 is still "not empty" the other MDA will be retrieved and used to create the resultant buffer memory logic address (FOT_ADDR) to transmit the second received IPB packet.

Autoconfiguration

The processing system 10 (FIG. 1), as indicated above, is provided with the capability of choosing the shortest route for messages to be communicated from one of the sections to another. This capability, however, requires that each fiber optic interface unit 24 (more particularly the DDTs 50 associated with each DTS pair 34, 36—FIG. 2) be provided a "picture" of the system; that is, that each fiber optic interconnect unit 24 is cognizant of what processor units P are located where. This is one function of the DDTs 50, and it is the responsibility of the autoconfiguration routine, run on the DDTs 50, to initialize and maintain that picture, i.e., the routing table information. That information should be updated in the event of a change in system configuration such as, for example, the addition, or removal of processor units (or movement of processor units from one section to another); or a break somewhere in the communication link 26.

Obviously, manual system configuration is possible; however, system operators would most likely find this to be an awkward task, giving rise to the high probability of errors. In addition, an operator most likely would not be able to quickly switch from one path to another between sections if any portion of a communication link 26 should fail.

The autoconfiguration process to be discussed permits the fiber optic interface connect unit to determine how information is transferred between processor units P of different sections. Autoconfiguration selects the shortest operational path between sections—with no operator intervention.

The DDTs 50 are provided with the ability to send and receive "diagnostic" packets over the communication links 26 (FIG. 1). Two types of diagnostic packets are used by the autoconfiguration routines: configuration status packets and configuration command packets. These diagnostic packets begin with the DSOT command character. All received packets that begin with the DSOT character are passed to the DDT 50, rather than to the buffer memory logic 55 (and out onto the local IPB), as described above. Configuration command packets are differentiated, by the DDT 50, from configuration status packets by the fact that they (configuration command packets) contain a single data byte, and are identified by a count field of all "1" bits.

It is the responsibility of the master MDS controller to determine which processor units P are in which section. This is done, as explained above, by querying the processor units P. When the master MDS controller 30 makes the determination of what processor units P are present in which sections, a message will be communicated via the DMB 32 to the DDTs 50 associated with each fiber optic interconnect unit 24 (FIGS. 1 and 2A), informing each DDT 50 of their "local" (i.e., within their section) processor units. The DDTs 50 each share their knowledge of system configuration with their siblings, using configuration status packets (FIG. 10) communicated to one another over the communication links 26. Based upon this shared knowledge of processor location, each DDT sets 50 writes the associated routing tables 206 (FIG. 6) so that inter-section IPB packets are sent over the shortest available route, and that other routes may be selected when a particular route is brought down for whatever reason.

Figure 9:
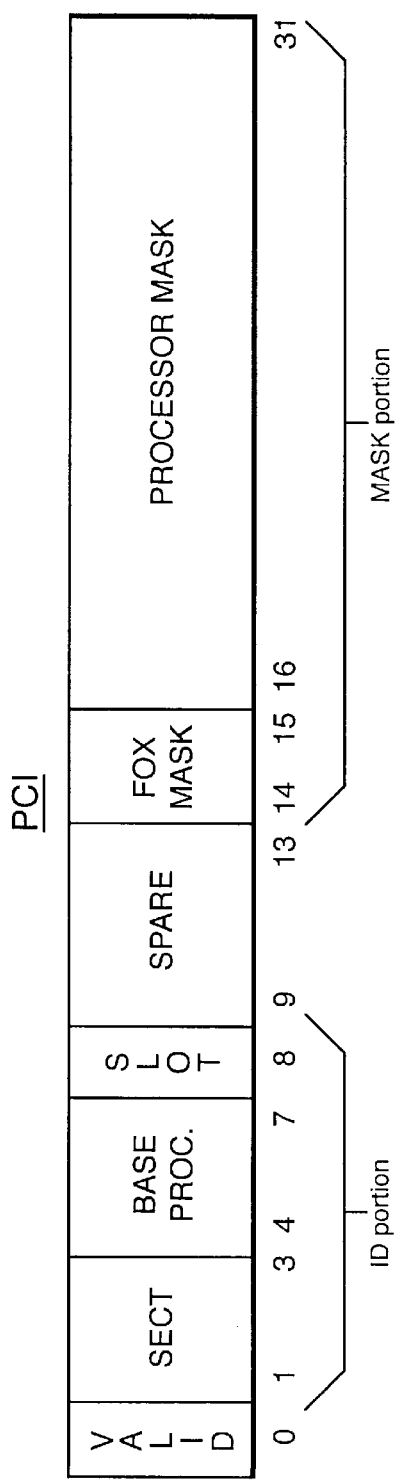
FIG. 9 is an illustration of the primary configuration information (PCI) used by each fiberoptic interconnect unit to route information packets transmitted by processor units of that section to processor units of another section.

Each DDT uses two data structures to perform autoconfiguration:

First, each DDT maintains, in a non-volatile memory 50a (FIG. 4A) a Primary Configuration Information (PCI); working copies are kept in the volatile memory 50b. The PCI, illustrated in FIG. 9, is a 32-bit double word made up of three basic parts: a "valid" bit position (bit 0), a location ID (bit positions 1–8) and a mask (bit positions 14–31), containing bit configurations that list the processor units (or FOX connections) local to the section associated with the DDT 50 in question.

The other data structure is a Secondary Configuration Information (SCI), illustrated in FIG. 12, stored in (volatile) memory 50b of the DDT 50. In effect, the SCI is two lists of PCIs received from the DDTs 50 of neighboring sections over the communication links 26. One list contains the PCIs of the DDTs 50 to the left, the other list contains the PCIs of the DDTs 50 to the right. If the system is configured as a ring, both lists may contain all sections. The order of the PCIs in the left and right lists will be different in this case.

Briefly, the autoconfiguration process involves a colloquy between the DDTs 50 of each of the sections with its neighbors, each DDT 50 communicating configuration status packets.

Figure 10:
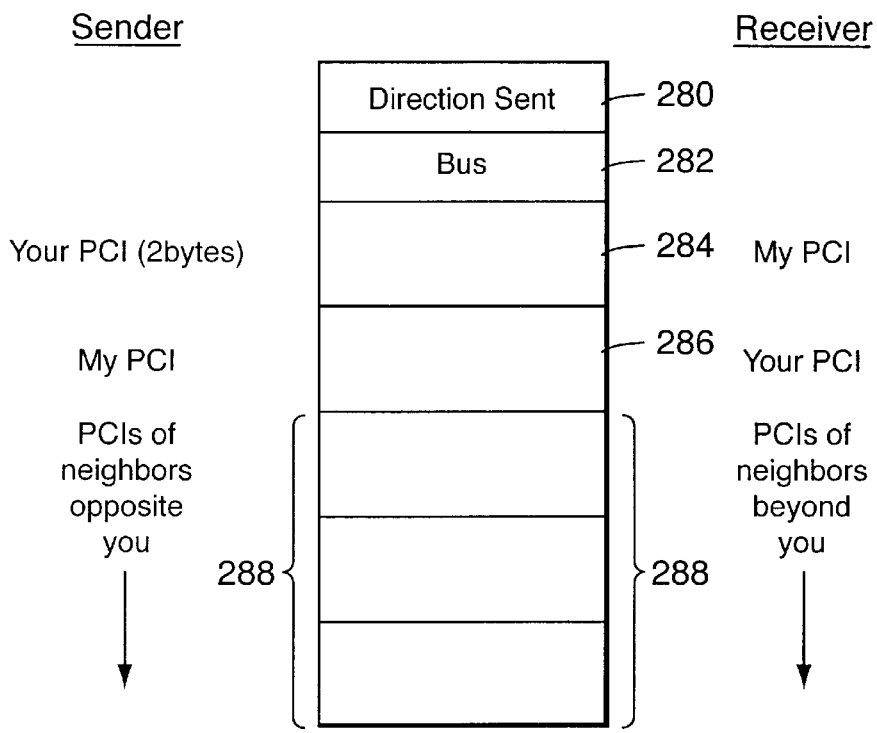
FIG. 10 is an illustration of the configuration status packet format used in an autoconfiguration process to provide the various data transfer sections with routing information in the form of a picture of system configuration.

FIG. 10 illustrates the format of a configuration status packet, as viewed by (1) the sender, and (2) the receiver. As FIG. 10 illustrates, the configuration status packet sent by a DDT 50 begins with a field 280 that indicates the direction the message is being sent (i.e., left or right).

The second byte 282 is an identification of which bus the sender DDT is associated with, i.e., the X-IPB 20 or the Y-IPB 22. This is necessary, obviously, only for multiple bus systems. The following field 284 contains the PCI of the sender's target; and the field 286 that follows supplies the PCI of the sender. The remaining fields 288 contain the PCIs of the DDTs of those sections in the opposite direction from the sender's target. Thus, with brief reference to FIG. 1, if the DDT 50 (FIG. 2A) associated with DTS 34*a* of the fiber optic interconnect unit 24 of section 2 were sending a configuration status packet to section 1, the fields 288 would contain PCIs of sections 3 and 4. Similarly, if the fiber optic interconnect unit 24 of section 1 were transmitting to that of section 2, the field 288 would contain the PCIs of sections 4 and 3.

The receiver's point of view is also illustrated in FIG. 10. The field 280 is the direction the configuration status packet was transmitted relative to the sender. If the receiver finds that the information of the direction field does correspond with the direction actually received, it knows a problem exists (e.g., misconnected communication links assuming sections are connected by communication links in the preferred convention of left to right and right to left. See FIG. 1). The bus information in field 282, of course, alerts the receiving DDT to a possible problem in the event that the bus of the sender does not correspond to that of the receiver.

Field 286 provides the receiver with the PCI of the sender, and field 284 tells the receiver what the sender thought was the receiver's PCI.

Finally, the remaining fields 288 provide the receiver with information of those sections on the other side of the sending DDT 50, rounding out the receiver DDT's picture of the configuration of the processor system 10.

The general rules of autoconfiguration are as follows:

First, when the system is powered up (or otherwise reset by software technique), each DDT 50 clears the memory locations of memory 50*b* containing the SCIs. A copy of the PCI, contained in the non-volatile memory 50*a*, is validated; that is, the valid bit is checked to see if it is TRUE. In addition, the ID portion is checked to ensure that the fiber optic interconnect unit has not been moved to a different section or bus since last power-up. If valid, autoconfiguration is enabled and a pair of configuration status packets are sent: one to the left neighbor, and one to the right neighbor. If the PCI is invalid, autoconfiguration is disabled, and it is not enabled until the PCI is updated to a valid value via the master MDS controller.

Second, when a configuration status packet is received, the receiving DDT 50 compares the information of "MY PCI" field 284 (what the sending DDT thought was the receiving DDTs PCI) with its PCI.

If the information of field 284 does not match the receiver's current PCI, it is assumed that the sender has not received any recognizable configuration status packets from the receiver, and the existence of a full duplex path between the sender and the receiver has not been proved. The existence of a full duplex path must be established before autoconfiguration can proceed, so the receiving DDT will reply to the sender with a configuration status packet based upon its current SCI but with the information from field 286 of the received configuration status packet installed. The receiver's SCI is not updated.

If the "MY PCI" field 284 of the received configuration status packet does match the receiving DDT's current PCI, the receiving DDT knows that the sending DDT has received a valid configuration status packet from it. If the received configuration status packet shows a change in the receiving DDTs perceived view of the system 10 (i.e., does not exactly match the receiving DDT's SCI), the receiving DDTs SCI is updated, and the receiving DDT sends two configuration status packets based on the newly updated SCI, one to the left, and one to the right, and the associated routing tables 206 of the DTSs (e.g., DTSs 34*a*, 34*b*) are updated.

Third, each DDT 50 maintains a software broadcast timer. Each time this timer expires, two configuration status packets, based upon the sender's current SCI, are sent, one to the left, and one to the right. The broadcast timer is started when autoconfiguration is enabled, and restarted each time configuration status packets are broadcast. Thus, each DDT 50 will broadcast a configuration status packet approximately every N (currently 300) milliseconds.

Fourth, two software "time out" timers are kept by the DDT 50, one for the left neighbor, and one for the right neighbor. These timers are used to check whether a configuration status packet has been received from each neighbor within a reasonable amount of time. When a configuration status packet is received from the left neighbor, the left time out timer is restarted; similarly, when a configuration status packet is received from the right neighbor, the right time out timer is restarted. If one of these timers should expire before a configuration status packet is received, the SCI is cleared for that side (left or right), and the routing tables 206 updated accordingly. The time out timers do not get restarted when they expire. The time out period should be at least twice as long as the broadcast period to prevent false timeouts.

Each time a DDT 50 updates its associated SCI, new values for the corresponding routing table 206 must be calculated. At this point, the SCI contains a list of all the processors known to be in the system, organized by distance, in fiberoptic hops, to the left and right. When the system is configured as a ring, the PCI of this DDT will eventually be seen on both sides in the SCI.

The routing table values are calculated by searching both sides of the SCI for each processor unit that is not present in the section in which the DTS is located. When a processor unit is not found, or is present in the PCI of this DDT, it is not placed in the routing table register. When the processor unit is found in only one side of the SCI, it is placed in the routing table 206 for that side. When the processor unit is found in both sides of the SCI, it is placed in the routing table register of the side where the processor is closer. If the processor unit is equidistance in both sides of the SCI, the routing table 206 of the left DTS will have the even numbered ID processor units set, and the routing table register 206 for the right DTS will have the odd numbered ID processors set.

When writing the routing table information, care must be taken to ensure that the same processor unit is not indicated as being present in both the left and right routing table registers 206 of the DTSs in order to preclude packets being sent to that processor unit twice, once in each direction, resulting in the delivery of duplicate messages.

A copy of the PCI is kept in the non-volatile memory 50*a* to facilitate autoconfiguration on power-up without intervention of the master MD! controller 30. It may happen that the processor unit P comes up to full operating capability before the master MDS controller 30 and associated systems. If so, processor units in different sections would be unable to communicate immediately.

Enabling and Disabling Autoconfiguration

To enable, or start, autoconfiguration, a DDT 50 and its associated DTSs (e.g., DTS 34*a*, 34*b*) follows the following steps:

a. The current PCI is checked. If it is not valid, autoconfiguration will remain disabled. If, however, the PCI is valid (i.e., the valid bit TRUE), the enablement process continues.

b. Configuration status packets are sent to the left and right neighbors of the DTS.

c. The broadcast timer is started, as are the two time out timers.

To disable or stop autoconfiguration, the DDT 50, and associated DTSs proceed as follows:

a. Operation of the broadcast timer is halted; and b. The operation of the two time out timers are halted.

The methods outlined above have a side effect; The master MDS controller 30 is responsible for issuing the enable and disable autoconfiguration commands to the DDTs 50. However, not all DDTs 50 can be commanded at once. After the first DDT 50 is commanded to disable autoconfiguration it will stop broadcasting configuration status packets. If the master MDS controller 30 is unable to send the disable configuration commands to the other DDTs 50 before their configuration status packet timeout timers expire, those DDTs will change their SCI and routing tables. Thus, the process of disabling autoconfiguration system wide in this manner will "damage" the last automatically generated configuration. Similarly, assuming that a good configuration exists (SCI and routing tables are correct) once the master MDS controller 30 enables autoconfiguration status packet timeouts will probably occur since the master MDS controller will likely be unable to enable autoconfiguration in the other DDTs within the configuration status packet timeout period. This causes all but the last DDT 50 receiving the enable autoconfiguration command to temporarily lose their previous (correct) configuration (after all the DDTs 50 have autoconfiguration enabled, the correct configuration will be rebuilt). If changes to the status of autoconfiguration are desired WITHOUT effecting the current configuration (SCI and routing tables) then simply enabling or disabling the autoconfiguration of each DDT 50 in turn is not workable. Accordingly, the autoconfiguration procedure of the present invention provides for nondestructive enabling and disabling.

To nondestructively disable autoconfiguration system wide, a DDT 50 proceeds as follows upon receipt of a disable command from the master MDS controller 30:

a. If autoconfiguration is already disabled, nothing is done;

b. If not, two DISABLE CONFIG configuration command packets are sent over the communication links: one to the right, one to the left;

c. Operation of the broadcast timer is terminated; and d. Operation of the two time out timers are terminated.

When a DISABLE CONFIG configuration command packet is received by a DTS, the following takes place:

a. If autoconfiguration is disabled, nothing is done;

b. If not, a DISABLE CONFIG configuration command packet is sent in the direction opposite from the one received. For example, if the DISABLE CONFIG was received from the left, then a new DISABLE CONFIG is sent to the right.

c. Operation of the broadcast timer is terminated; and d. Operation of the two time out timers are terminated.

A nondestructive enabling of autoconfiguration system-wide follows somewhat similar steps when the enable command is received from the master MDS controller 30:

a. If autoconfiguration is already enabled, nothing is done;

b. If not, the current PCI is checked by the DDT 50. If it is not valid, autoconfiguration remains disabled;

c. Two ENABLE CONFIG configuration command packets are sent, one to the right and one to the left;

d. Configuration status packets are sent left and right;

e. Operation of the broadcast timer is initiated; and f. Operation of the two time out timers is initiated.

When an ENABLE CONFIG configuration command packet is received by a DDT, it will follow these steps:

a. If autoconfiguration is enabled, nothing is done;

b. The current PCI is validated. If not valid autoconfiguration remains disabled;

c. If the PCI is valid, an ENABLE CONFIG configuration command packet is sent in the opposite direction from the one received;

d. Configuration status packets are sent to the left and right neighbors;

e. Operation of the broadcast timer is initiated; and f. Operation of the two time out timers is initiated.

The ENABLE CONFIG and DISABLE CONFIG configuration command packets are passed around the ring on the communication links 26, until they reach a fiberoptic interface unit 24 that is already in the desired autoconfiguration enable/disable state. This results in all fiber optic interconnect units 24 either disabling autoconfiguration before any time out timers can expire (which would result in the configuration changing) or enabling autoconfiguration and resuming transmission of configuration status packets before any time out timers can expire (which would cause any current configuration to be lost before a replacement can be built).

Figure 11:
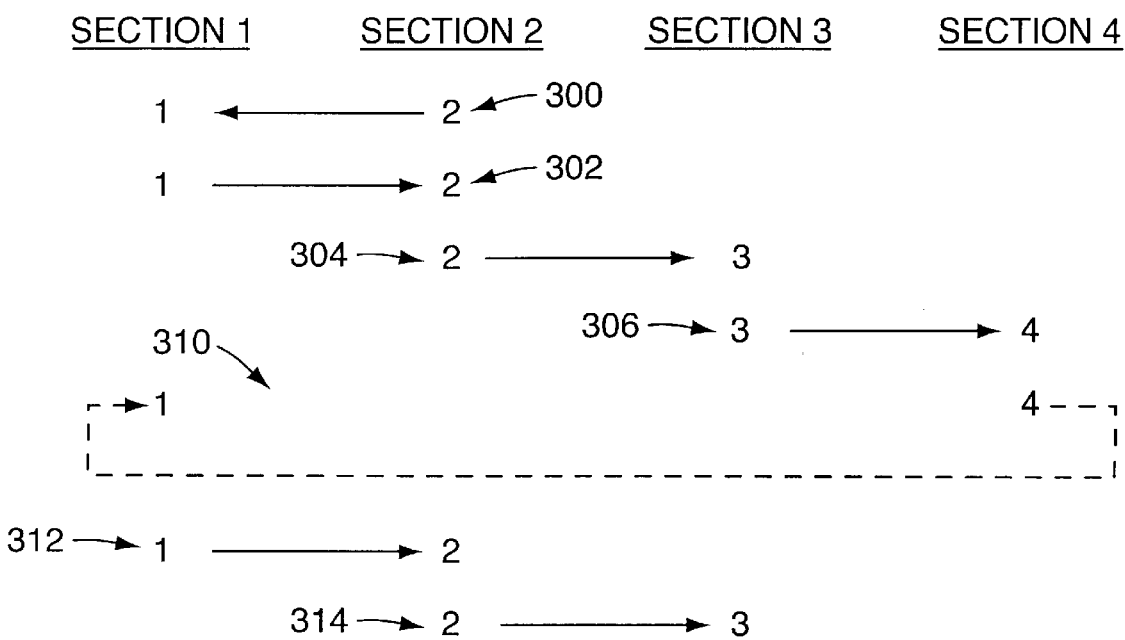
FIG. 11 is a diagrammatic illustration of the autoconfiguration process.

At this point, an example would be advantageous to explain a turn-on of autoconfiguration from a completely non-configured state in a four section system. Referring now to FIG. 11, illustrated is a flow of configuration messages through a "worst case" path. Each of the steps, designated with the reference numerals 300–310 represent the forwarding of one configuration status packet from one section to another. In a real world system, all sections would be performing similar steps concurrently.

Referring first to the step illustrated at 300, and with reference to FIGS. 1 and 2A, assume that the system is initially in a disabled state, and that the master MDS controller 30 has obtained a picture of the configuration of the system 10, and broadcast that configuration to the DDTs 50 associated with each pair of data transfer sections 34, 36 of the fiberoptic interconnect units 24. Assume further that the MDS controller 30 has commanded the DDTs 50 associated with the fiberoptic interconnect unit 24 of section 2 to enable configuration. Thus, at step 300, the data transfer sections 34*a* and 36*a* of section 2 will transmit to the receiver data transfer sections of section 1 a configuration status packet in the format of FIG. 10, described above. Although section 1 receives a message from section 2, section 2 has not yet received a configuration status packet from Section 1. Thus, a full duplex path has not yet been proved until section 2 receives a message from section 1.

At step 302, section 2 (i.e., the DDTs 50, via the corresponding DDTs) receive a message from section 1, and find that the My PCI field 284 (FIG. 10) in the received message is correct. The SCI of the receiving DDT is updated, followed by corresponding update of the routing tables 206 associated with the receiver's DTSs. Section 2 will then send updated configuration status packets to its neighbors (only the message to section 3 is shown, at step 304).

Before continuing, it is worthwhile to note that while sections 1 and 2 were establishing the existence of a full duplex path between them, i.e., the paths formed by the fiberoptic links 40 and 42, sections 2 and 3, 3 and 4, and 4 and 1 are also establishing the existence of full duplex paths.

Returning to FIG. 11, step 304 represents configuration status packet transmission from section 2 to section 3. The packet, as received by section 3, adds to section 3's awareness the existence of sections 1 and 2 (and, of course, the processor units P contained within each section). Section 1 was previously unknown to section 3, so the associated SCIs and routing tables 206 are updated, and configuration status packets are sent to its (3) neighbors (only the packet sent to section 4, at step 306, is shown).

Thus, at step 306, section 3 transmits a configuration status packet to section 4 showing, to section 4, the existence of sections 1, 2, and 3. Sections 1 and 2 were previously unknown to section 4, so its SCI and associated routing tables are updated, and configuration status packets are sent to its neighbors (again, only the packet sent to section 1 at step 310 is shown in FIG. 11).

At step 310, FIG. 11, section 1 receives the configuration status packet sent by section 4. Section 1 is now apprised of the existence of sections 3 and 4, which were previously unknown to it, so section 1's SCI and corresponding routing tables are updated, and configuration status packets are sent to its neighbors (only the packet sent to section 2 is illustrated).

At step 312, section 2 receives the configuration status packet from section 1, showing the existence of sections 1, 2, 3, and 4. Section 4 was previously unknown to section 2, resulting in an update of its SCI and corresponding routing tables. Section 2 then transmits configuration status packets to its neighbors (i.e., sections 1 and 3; only the packet sent to section 3 is shown in FIG. 11).

Finally, at step 314, the configuration status packets sent by section 2 is received by section 3, showing it the existence of sections 1, 2, 3, and 4. All this was already known to section 3, however, so it does nothing.

The sequence of configuration status packet transmissions outlined above, and shown in FIG. 11, represents the longest possible chain of configuration status packets; and, in fact, is an artificially long chain because the effects of bi-directional packet transfers are not shown, and the effects of concurrent configuration by other fiberoptic interconnect units in the system are not shown.

The data structure of the SCI, maintained in memory 50b by the DDT 50, illustrated in FIG. 12, is, in effect, two PCI lists: one list contains the PCIs of the neighbor sections to the left; the other list contains the PCIs of the neighbor sections to the right. Thus, if the SCI data structure of FIG. 12 (designated generally with the reference numeral 400) is that of the DDT for the DTS pair 34 (FIG. 2A) in section 2, the left neighbor list would contain at entry 402 the PCI for the closest neighbor to its left (N1, section 1 (see FIG. 1)). At entry 404 is the PCI for the 2nd closest neighbor to the left of the DTS pair 34 (which is in section 2), section 4 (as viewed in FIG. 1). And, at 406 and 408 are the PCIs for the farthest neighbors (N3, N4) section 3 and itself, section 2.

Similarly, the list for the right neighbors (N1, . . . , N4) contains at 410, 412, and 414 the PCIs for the neighbors (N1, . . . , N3) to the right of the DTS of section 2, sections 3, 4, and 1, respectively. As with the left neighbors, the right neighbor list, at 416, contains the PCI for the farthest neighbor, itself, section 2. When the processing system 10 is configured as a ring, as in FIG. 1, the neighbors will be in the same but reverse order.

The size of the ring is determined by searching the SCI list for the PCI of this particular section of the DDT 50. It should be found the same number of "hops" away in both the left and right directions.

The contents of the SCI are built by examining the contents of the configuration messages. These messages specify the neighbors in the direction from which the message was received. If a message is received that shows a different configuration than the SCI, the SCI is updated, and the new information is sent to both of the neighboring sections.

Installation of configuration messages into the SCI is illustrated in FIGS. 13A and 13B. When a configuration message is received it is validated (i.e., checked to see if the direction of transmission is the opposite of the direction of receipt and the bus is correct), and the neighbor's (i.e., sender's) PCI fields are transferred into the proper side of the SCI. For example, as illustrated in FIG. 13A, a configuration message was received from the left neighbor (i.e., it was originally sent right by the sender to the right) on the X bus (i.e., from the X IPB 20 of the senders section). Since this is as expected, the valid PCIs (N1, N2, N3 and N4) are transferred to the SCI's list of left neighbors, at locations 402, 404, 406, and 408, respectively. Remember that the received configuration message shown in FIG. 13A is how the sender views the system.

Only valid PCIs (i.e., the valid bit SET) are transferred. If the section's own PCI is found as one of the neighbors, the transfer of PCIs from the received configuration message to the left side of the SCI structure will stop on the next PCI.

Turning now to FIGS. 14A and 14B, the routing table information is extracted from the SCI as follows: FIG. 14A illustrates an SCI data structure for section 1 of a processor system 10, containing 16 processor units P with IDs 0 through 15. Further, the system, as the SCI data structure of FIG. 14A illustrates, has four sections. The (section 1) for this SCI data structure FIG. 14A contains processor units P having IDs 0 1, 2, 3. The left most neighboring section, section 2, contains processor units P having the IDs 4, 5, 6 and 7; and the right most neighboring section, section 4, contains processor units P having the IDs of 12, 13, 14, 15. Thus, at 420a and 420b are the PCIs for the left most and right most neighboring sections to this section. Similarly, at 422a/b and 424a/b are the PCIs for the other neighboring sections extending to the left and right, respectively. The last left and right PCIs at 426a/b are this section's PCI.

Starting with the processor unit P having an ID of 0 the SCI data structure (FIG. 14) is searched for each "non-local" processor unit P (i.e., those not associated with the particular section of the DDT 50) located in both sides (left and right) of the SCI. If found, it will be added to a routing table register (not shown) maintained by the DDT 50. Since processor units 0 through 3 are local, they will not be added to the routing tables.

If the processor unit P is "closer" in the right side of the SCI data structure, it will be added to the information that is ultimately written to the routing table 206 maintained by the RIGHT DTS 34b (if closer on the left, it will be added to the routing table maintained by the LEFT DTS 34a). If equidistance, the processor units P having IDs that are odd are added to the routing table information for the LEFT DTS 34a, and those having odd IDs are added to the routing table 206 maintained by the RIGHT DTS 34b (FIG. 2A).

In the example illustrated in FIGS. 14A and 14B, the routing table 206 (L) contains the processor unit P IDs 4, 5, 6, 7 (those processor units P of the left most neighbor) and 9 and 11 (processor units P that are equidistance from this section). Similarly, the right routing table 206 (R) contains the processor IDs for the right most neighbor, i.e., IDs 12, 13, 14 and 15, as well as the equidistant processor units having even IDs, i.e., 8 and 10.

Continuing with this example, and in particular the SCI data structure illustrated in FIG. 14A, construction of a configuration message can now be described. Assume that the DDT 50 of the SCI data structure of FIG. 14 desires to build and send a configuration message to its right most neighbor. Assume further, as the SCI data structure 14A confirms, that this section has the processor units P with the IDs 0, 1, 2, and 3. The configuration message, illustrated at 450 (FIG. 14C) will contain, at field 454, the PCI of the closest neighbor to the right, the destination processor. The next PCI, at field 456, is the senders PCI, My PCI. The remaining fields 458, 460, and 462 are the PCIs of the neighboring sections, extending to the left (the first 3 in this case 420a, 422a, and 424a). (If fewer than 3 were valid, only the valid PCIs would be installed.)

In summary, then, there has been disclosed a multiprocessing system 10 generally segmented into sections, with each section having a communication link with neighboring sections via fiberoptic transmission medium. The means for interconnecting the various processor units P with its siblings of other sections is a fiberoptic interconnect unit of some intelligence, capable of establishing and maintaining a picture of the system configuration (i.e., which processors P are in which sections, including its own). Further, the fiberoptic interconnect unit 24 intelligence (provided by DDTs 50) permits, for packets to destination processors outside the particular section, transmitting to that section in a direction that is the shortest possible available route for current conditions. Further, it will be evident to those skilled in the art, that in the event a communication link 26 from one section to another is broken during operation, the ongoing autoconfiguration procedure will sense that break by the timeout timers, causing each fiberoptic interconnect unit 24 to reestablish its picture of system configuration.

Thus, while a full and detailed disclosure of the invention has been made, it will be obvious to those skilled in the art that various modifications and alterations may be made to the invention without going outside the scope of the invention. For example, although a preferred embodiment of the invention is to use communication links formed by optical fibers in a full duplex mode, other transmission mediums can be used to interconnect multiple processors, and still obtain the advantages of the present invention.

What is claimed is:

1. Apparatus for communicating messages between at least three multiprocessor groups, each of the multiprocessor groups including a plurality of processor units coupled to one another for interprocessor communication by an interprocessor bus, the messages including information identifying a one of the plurality of processor units of a one of the multiprocessor groups as a destination processor unit for receiving the message, the apparatus comprising:

each of the multiprocessor groups including interface means coupled to the interprocessor bus of that multiprocessor group for receiving messages communicated thereon by a processor unit of that multiprocessor group to the destination processor unit;

link means intercoupling the interface means of each multiprocessor group in a ring configuration for communicating data thereon;

the interface means of each of the multiprocessor groups including first circuit means for communicating all data received from the link means to the interprocessor bus in the form of a message, second circuit means for retrieving and storing messages communicated on the interprocessor bus having information identifying the destination processor unit as not being a one of the plurality of processor units of that multiprocessor group, and third circuit means for transmitting the messages from the second circuit means onto the link means in the form of data; and configuration means for determining which processor unit is located with which multiprocessor group of processor units.

2. The apparatus of claim 1, the first circuit means including means for scheduling communication of the data to the interprocessor bus means in the order received from the link means.

3. The apparatus of claim 1, wherein the second circuit means includes means for storing only those messages destined for a processor unit forming a part of the other of the multiprocessor groups of processor units.

4. A multiprocessing system, comprising:

at least three processor sections, each of the processor sections containing a plurality of processor means;

link means interconnecting the three processor sections in a ring configuration for communicating data therebetween;

each of the processor sections including,
    interprocessor bus means for communicating message data between the plurality of processor means, the message data having identification data indicative of a destination processor means of said message data;
    data interconnect means having right and left data transfer means respectively coupled by the link means to each of the other of the three processor sections and to the interprocessor bus means for communicating message data between the plurality of processor means of said processor section and the plurality of processor means of other of the three processor sections, the right and left data transfer means each respectively coupled to a one and another of the processor sections, and including routing table means containing information indicative of the processor section nearest the left or the right data transfer means, the multiprocessing system further including maintenance diagnostic controller means coupled to each of the plurality of processor means of each of the processor sections for interrogating each of the plurality of processor means to determine to which of the processor sections each of the plurality of processors means belongs.

5. A multiprocessing system, comprising:

at least three processor sections, each of the processor sections containing a plurality of processor means;

link means interconnecting the three processor sections in a ring configuration for communicating data therebetween;

each of the processor sections including,
interprocessor bus means for communicating message data between the plurality of processor means, the message data having identification data indicative of a destination processor means of said message data;
data interconnect means having right and left data transfer means respectively coupled by the link means to each of the other of the three processor sections and to the interprocessor bus means for communicating message data between the plurality of processor means of said processor section and the plurality of processor means of other of the three processor sections, the right and left data transfer means each respectively coupled to a one and another of the processor sections, and including routing table means containing information indicative of the processor section nearest the left or the right data transfer means, the multiprocessing system further including means for writing the routing table means of each data interconnect means.

6. A multiprocessor system, comprising:
a plurality of processor units, a first number of the processor units being grouped in a first section, a second number of the processor units being grouped in a second section, and a third number of the processor units being grouped in a third section;
link means coupling the first, second, and third sections to one another in a ring configuration for communicating data therebetween;
each of the first, second, and third sections including interconnect means coupling said section to the link means for transmitting and receiving data to and from the link means, the interconnect means including right and left transmit/receive means coupled to first and second portions of the link means for communicating data in a first and a second direction, respectively;
routing table means in each of the interconnect means for identifying the shortest route to a destination processor unit for receiving data by identifying which of the first and second directions to use for communicating data to the destination processor unit; and
diagnostic processor means coupled to each of the plurality of processor units, and operating to interrogate each of the processor units to determine which of the first, second, and third sections with which each of the plurality of processor units is grouped.

7. A multiple processor system, comprising:
a plurality of processor units;
at least three interprocessor sections each including at least one of the plurality of processor units;
a plurality of link means, each link means being coupled between pairs of the three interprocessor sections to form a ring configuration for communicating data between the interprocessor sections; and
each of the three interprocessor sections including an interconnect means coupled to a pair of the link means, and an interprocessor bus means coupling the interconnect means to the processor units of said interprocessor section for communicating messages, the interconnect means including storage means containing information indicative of which of the three interprocessor sections includes which of the plurality of processor units;

whereby a message sent on the interprocessor bus means by a sender processor unit to be received by a destination processor unit is received first by the interconnect means only if said destination processor unit is in an interprocessor section different from that of the sender processor unit for communication on a one of the associated pair of link means that provides a shortest communication path to the destination processor unit as determined by reference to information contained in the storage means, the multiple processor system further including a maintenance diagnostic processor means coupled to the processor units of the multiple processor system, the maintenance diagnostic processor means operating to determine which interprocessor section includes which processor unit and to write to the storage means the information indicative of which of the three interprocessor sections includes which processor units.

8. The multiple processor system of claim 7, wherein the maintenance diagnostic processor means comprises a pair of bus means for communicating data between the maintenance diagnostic processor means and the plurality of processor units.

9. A multiple processor system, comprising:
a number of processor sections, each processor section including one or more processor units;
an interprocessor bus interconnecting the processor units of each of the processor sections for communicating message data therebetween;
a plurality of link bus means interconnecting the number of processor sections in a ring configuration for communicating message data from the one or more of the processor units of a one of the number of processor sections to another of the one or more processor units of another one of the number of processor sections, the message data containing information identifying the another one of the processor units as a destination processor unit to receive the message data; and
each of the number of processor sections including link interface means coupled to a pair of the plurality of link bus means and to the interprocessor bus of said processor section, each of the link interface means including receiving means for communicating all message data received on the link bus means to the interprocessor bus and transmit means for communicating message data having information identifying the destination processor unit as not being any of the one or more processor units of the section to a selected one of the pair of the plurality of link bus means.

10. The multiple processor system of claim 9, the link interface means including means for determining which of the pair of link bus means coupled to said processor section provides a shortest communication path to the destination processor unit.

11. The multiple processor system of claim 10, wherein the plurality of link bus means provides a bit serial communication path between the number of processor sections.

12. The multiple processor system of claim 10, wherein each of the number of link bus means includes fiber optic means to communicate the message data.

13. The multiple processor system of claim 9, wherein the receiving means includes first circuit means for storing the message data received on the link interface means, and second circuit means for communicating the message data from the means for storing to the interprocessor bus means.

14. The multiple processor system of claim 9, wherein the receiving means includes means for storing the message data received by the link interface means before communicating the message data to the interprocessor bus, and for storing message data received from the interprocessor bus before communication to the selected of the pair of link bus means coupled to said processor section.

15. The multiple processor system of claim 9, wherein the link bus means provides a bi-directional communication path between pairs of the number of processor sections interconnected by the link bus means.

16. A method of communicating message data in a multiple processor system having a plurality of processor units grouped in a number of processor sections containing one or more of the plurality of processor units interconnected by an interprocessor bus for communicating message data therebetween, the message data including information identifying a destination one of the plurality of processor units for receiving the message data, the method comprising the steps of:

interconnecting the number of processor sections by link means in a ring configuration for communicating the message data from a first processor unit contained in a one of the number of processor sections to the destination processor unit contained in another one of the number of processor sections, the message data containing information identifying the destination processor unit; and each of the number of processor sections operating to communicate the message data received from the link means to the interprocessor bus of said processor section, and transmitting the message data from the interprocessor bus of said processor section to a neighbor one of the number of processor sections if the information identifies the destination processor unit as not contained in said processor section.

17. The method of claim 16, including the step of maintaining location data indicative of the location of the number of processor sections in the ring configuration and the processor units contained in each of the number of processor sections.

18. The method of claim 17, including determining from the location data a shortest path from the first processor unit to the destination processor unit.

19. The method of claim 18, including maintenance diagnostic processor means coupled to each of the number of processor sections interrogating each of the number of processor sections to determine the location of the plurality of processor units and develop the location data.

20. The method of claim 19, including the step of the maintenance diagnostic processor means providing the location data to each of the processor sections.

* * * * *

UNITED STATES PATENT AND TRADEMARK OFFICE
CERTIFICATE OF CORRECTION

PATENT NO.    : 6,453,406 B1
DATED         : September 17, 2002
INVENTOR(S)   : Scott Sarnikowski et al.

It is certified that error appears in the above-identified patent and that said Letters Patent is hereby corrected as shown below:

Column 1,
Line 11, reads "another by an bus means for interprocessor communication" it should read -- another by an interprocessor bus means for interprocessor communication --.

Column 2,
Line 19, reads "section is in the form of a bi-directional fiberoptic data path" it should read -- sections is in the form of a bi-directional fiberoptic data path --.

Column 4,
Line 51, reads "interface unit 24 that connects the IPBs 20, 22 to a com-" it should read -- interconnect unit 24 that connects the IPBs 20, 22 to a com- --.

Column 6,
Line 1, reads "As FIG. 2 further illustrates, the communication links 26" it should read -- As FIG. 2a further illustrates, the communication links 26 --;
Line 5, reads "munications path. Thus, as Fig. 2 shows, the communica-" it should read -- munications path. Thus, as Fig. 2a shows, the communica- --.
Line 13, reads "36 (LEFT and RIGHT DTSs 34a, 34b) communicate the" it should read -- 36 (LEFT and RIGHT DTSs 36a, 36b) communicate the --;
Line 52, reads "connect unit 24 is cognizant (as a result of a autoconfigu-" it should read -- connect unit 24 is cognizant (as a result of an autoconfigu- --.

Column 7,
Line 60, reads "chip set, as it shall hereinafter referenced, is a receiver/" it should read -- chip set, as it shall hereinafter be referenced, is a receiver --.

Column 8,
Line 18, reads "processor system 10. This later information transfer capa-" it should read -- processor system 10. This latter information transfer capa- --;
Line 67, reads "received by the LEFT DTS 14a, transferred to the IPB 20," it should read -- received by the LEFT DTS 34a, transferred to the IPB 20, --.

Column 13,
Line 29, reads "MDAR logic 65a is a 1-bit Room register 124 for storing the" it should read -- MDAR logic 65a is a 1-bit Room bit register 124 for storing the --;
Line 33, reads "counter 26 that receives the INDEX CTL signal provided by" it should read -- counter 126 that receives the INDEX CTL signal provided by --;
Line 58, reads "Room management logic 166 contains, for each MDA, a" it should read -- Room management logic 66 contains, for each MDA, a --.

UNITED STATES PATENT AND TRADEMARK OFFICE
CERTIFICATE OF CORRECTION

PATENT NO.    : 6,453,406 B1
DATED         : September 17, 2002
INVENTOR(S)   : Scott Sarnikowski et al.

It is certified that error appears in the above-identified patent and that said Letters Patent is hereby corrected as shown below:

Column 14,
Line 37, reads "MDAR logic 85*a* and transmit MDAR logic 956 are the" it should read -- MDAR logic 85*a* and transmit MDAR logic 85*b* are the --.

Column 15,
Line 32, reads "tri-state driver 146 which, in turn, couples it to the tri-state" it should read -- tri-state driver 196 which, in turn, couples it to the tri-state --.

Column 16,
Line 51, reads "selected by the MPX 222 MDA is applied to a Room" it should read -- MDA selected by the MPX 222 MDA is applied to a Room --.

Column 17,
Line 65, reads "moved from the IPB 20 to the memory circuit 57 where it is" it should read -- moved from the IPB 20 to the memory circuit 274 where it is --.

Column 18,
Line 8, reads "The same, of course, is the same for the DTSs 36 that" it should read -- The same is true, of course, for the DTSs 36 that --;
Line 36, reads "bits correspond to presence or absence of a POX 13 con-" it should read -- bits correspond to presence or absence of a FOX 33 con- --;
Line 53, reads ""scheduled" by storing its MDA in the scheduling FIFO 234." it should read -- "scheduled" by storing its MDA in the scheduling FIFO 232. --.

Column 19,
Line 10, reads "has a full compliment of processor units P divided into the" it should read -- has a full complement of processor units P divided into the --;
Line 14, reads "numbers (I.D.) of 0 through 15 that section 1 contains:" it should read -- number (I.D.) of 0 through 15; that section 1 contains --;
Line 16, reads "processor units with I.D.'s of 3-7; section 4 contains pro-" it should read -- processor units with I.D.'s of 3-7; section 3 contains pro- --.

Column 24,
Line 59, reads "processor unit is equidistance in both sides of the SCI, the" it should read -- processor unit is equidistant in both sides of the SCI, the --.

UNITED STATES PATENT AND TRADEMARK OFFICE
CERTIFICATE OF CORRECTION

PATENT NO. : 6,453,406 B1
DATED : September 17, 2002
INVENTOR(S) : Scott Sarnikowski et al.

It is certified that error appears in the above-identified patent and that said Letters Patent is hereby corrected as shown below:

Column 25,
Line 5, reads "vention of the master MD! controller 30. It may happen that" it should read -- vention of the master MDS controller 30. It may happen that --.

Column 29,
Line 6, reads "equidistance, the processor units P having IDs that are odd" it should read -- equidistant, the processor units P having IDs that are odd --.

Column 31,
Line 49, reads "each of the processor units to determine which of the" it should read -- each of the processor units to determine with which of the --;
Line 50, reads "first, second, and third sections with which each of the" it should read -- first, second, and third sections each of the --.

Signed and Sealed this

Second Day of September, 2003

JAMES E. ROGAN
*Director of the United States Patent and Trademark Office*